(12) United States Patent
Endo et al.

(10) Patent No.: US 7,426,051 B2
(45) Date of Patent: Sep. 16, 2008

(54) IMAGE PROCESSING METHOD AND IMAGE PROCESSING SYSTEM USING THE SAME

(75) Inventors: Masakatsu Endo, Nagano (JP); Hideki Morozumi, Nagano (JP); Kenji Sakuda, Nagano (JP); Kazunori Suenaga, Nagano (JP); Makoto Oyanagi, Nagano (JP); Toshihiko Katayama, Nagano (JP); Yoichi Wakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 852 days.

(21) Appl. No.: 10/735,152

(22) Filed: Dec. 12, 2003

(65) Prior Publication Data

US 2004/0179221 A1  Sep. 16, 2004

(30) Foreign Application Priority Data

Dec. 12, 2002 (JP) ............................. 2002-360983
Apr. 4, 2003 (JP) ............................. 2003-101849

(51) Int. Cl.
*G06F 15/00* (2006.01)
*G06F 13/00* (2006.01)

(52) U.S. Cl. ..................................... 358/1.15; 719/328
(58) Field of Classification Search ................ 358/1.15, 358/1.16, 1.14; 707/9, 10, E17.116; 709/225, 709/219, 223; 719/328, 315, 318, 320, 201; 715/205, 246, 234; 348/586

See application file for complete search history.

(56) References Cited

FOREIGN PATENT DOCUMENTS

JP  2002-330394  11/2002

OTHER PUBLICATIONS

Abstract of Japanese Patent Publication No. 2002-330394, Pub. Date: Nov. 15, 2002, Patent Abstracts of Japan.

*Primary Examiner*—Saeid Ebrahimi Dehkordy
(74) *Attorney, Agent, or Firm*—Martine Penilla & Gencarella, LLP

(57) ABSTRACT

It is generated a control information item including a script for the image processing which is described by a markup language. The control information item is communicated between an image supply device and an image output device connected via a communication path. A control protocol for communicating the control information item is interpreted by a first entity which executes processing for a first hierarchic layer of a communication protocol. A management protocol for managing an image data file including the image data is interpreted by a second entity which executes processing for a second hierarchic layer of the communication protocol which is lower than the first hierarchic layer. A physical layer of the communication path is controlled by a third entity which executes processing for a third hierarchic layer of the communication protocol which is lower than the second hierarchic layer. A command in the control information item is translated between the control protocol and the management protocol.

21 Claims, 20 Drawing Sheets

FIG. 9

```xml
<?xml version="1.0"?>
<dps xmlns="http://www.xxxx">
    <startJobRequest>
        <job>
            <jobConfig>
                <quality>01000000</quality>
                <paperSize>02010000</paperSize>
                <paperType>03020000</paperType>
                <fileType>04150000</fileType>
                <date>05010000</date>
                <fileName>06000000</fileName>
                <imageOptimize>07000000</imageOptimize>
                <layoutItem>08010000</layoutItem>
            </jobConfig>
            <printInfo>
                <image>
                    <imageID>00000001</imageID>
                    <imageDate>2002/05/03</imageDate>
                </image>
            </printInfo>
        </job>
    </startJobRequest>
</dps>
```

FIG. 10

```xml
<?xml version="1.0"?>
<dps xmlns="http://www.xxxx">
    <GetFileRequest>
        <fileID>00000001</fileID>
        <buffPtr>00100000</buffPtr>
    </getFileRequest>
</dps>
```

FIG. 13

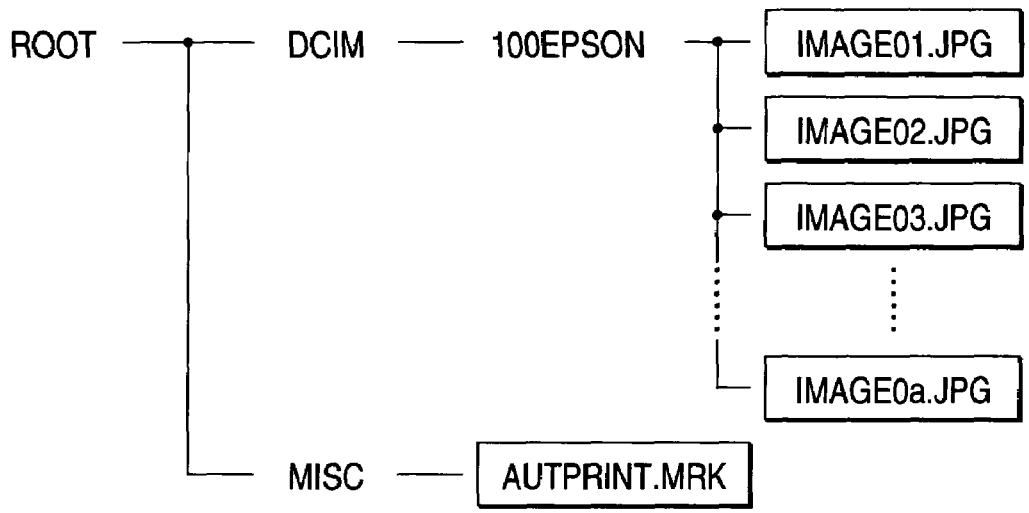

```
ROOT ──┬── DCIM ── 100EPSON ──┬── IMAGE01.JPG
       │                      ├── IMAGE02.JPG
       │                      ├── IMAGE03.JPG
       │                      ⋮
       │                      └── IMAGE0a.JPG
       │
       └── MISC ── AUTPRINT.MRK
```

FIG. 14

```
[JOB]
PRT PID = 001
PRT TYP = STD
PRT QTY = 002
IMG SRC = "./DCIM/100EPSON/IMAGE01.JPG"
IGM FMT = EXIF2-J
[JOB]
PRT PID = 002
PRT TYP = STD
PRT QTY = 001
IMG SRC = "./DCIM/100EPSON/IMAGE02.JPG"
IGM FMT = EXIF2-J
[JOB]
PRT PID = 003
PRT TYP = STD
PRT QTY = 001
IMG SRC = "./DCIM/100EPSON/IMAGE03.JPG"
IGM FMT = EXIF2-J
```

FIG. 17
```
<?xml version="1.0"?>
<dps xmlns="http://www.xxxx">
  <GetObjectIDRequest>
    <basePathID>00000002</basePathID>
    <imagePath>..\DCIM\100EPSON\IMAGE.JPG</imagePath>
  </getObjectIDRequest>
</dps>
```

FIG. 18
```
<?xml version="1.0"?>
<dps xmlns="http://www.xxxx">
  <opResult>
    XX000000
  </opResult>
  <getObjectIDResponse>
    <basePathID>00000002</basePathID>
    <imagePath>..\DCIM\100EPSON\IMAGE.JPG</imagePath>
    <imageID>00000002</imageID>
  </getObjectIDResponse>
</dps>
```

FIG. 19
```
<?xml version="1.0"?>
<dps xmlns="http://www.xxxx">
  <getFileInfoRequest>
    <fileID>00000001</fileID>
  </getFileInfoRequest>
</dps>
```

FIG. 20
```
<?xml version="1.0"?>
<dps xmlns="http://www.xxxx">
  <opResult>
    XX000000
  </opResult>
  <getFileInfoResponse>
    <fileType>04000000</fileType>
    <fileSize>1048576</fileSize>
  </getFileInfoResponse>
</dps>
```

FIG. 24
```
<?xml version="1.0"?>
<dps xmlns="http://www.xxxx">
  <notifyJobStatusRequest>
    <jStatus>11000000<jStatus>
    <prtPid>000</prtPid>
    <imagePath>..\dcim\100EPSON\IMAGE.JPG</imagePath>
    <copyId>02</copyId>
    <progress>04/06</progress>
    <jEndReason>10000000</jEndReason>
  </notifyJobStatusRequest>
</dps>
```

FIG. 25
```
<?xml version="1.0"?>
<dps xmlns="http://www.xxxx">
  <notifyDeviceStatusRequest>
    <errorStatus>0E10000</errorStatus>
    <reason>0F010000</reason>
    <disconnectEnable>10010000</disconnectEnable>
    <capacityChange>14010000</capacityChange>
  </notifyDeviceStatusRequest>
</dps>
```

FIG. 26
```
<?xml version="1.0"?>
<dps xmlns="http://www.xxxx">
  <startJobRequest>
    <job>
      <jobConfig>
        <quality>01000000</quality>
        <paperSize>02010000</paperSize>
        <paperType>03020000</paperType>
        <fileType>04150000</fileType>
        <date>05010000</date>
        <fileName>06000000</fileName>
        <imageOptimize>07000000</imageOptimize>
        <layoutItem>08010000</layoutItem>
      </jobConfig>
      <printInfo>
        <image>
          <imageID>00000002</imageID>
          <imageDate>2002/05/03</imageDate>
          <prtPid>001</prtPid>
          <imagePath>..\DCIM\100EPSON\IMAGE.JPG</imagePath>
          <copies>002</copies>
        </image>
      </printInfo>
    </job>
  </startJobRequest>
</dps>
```

IMAGE PROCESSING METHOD AND IMAGE PROCESSING SYSTEM USING THE SAME

BACKGROUND OF THE INVENTION

The present invention relates to an image processing system and an image output method, wherein control information and image data files are transmitted over a communication channel, and images based on the image data files which are stored in an image supply device, are output by way of an image output device.

Japanese Patent Publication No. 2002-330394A discloses a so-called direct print system, wherein a digital still camera is connected to a printer without involvement of a personal computer or the like, and images captured by the digital still camera are printed by the printer.

In the direct print system, image data, a print job start command, and the like are exchanged between the digital still camera and the printer through use of a protocol unique to a vendor.

However, since each vendor uses its own protocol, images captured by a digital still camera can be printed by a printer of a certain vendor but may not be printed by a printer of another vendor. In such a case, if a single protocol is used by a plurality of vendors, images captured by a digital still camera could be printed by a printer of any of the vendors. However, a printer has functions unique to each vendor, and difficulty is encountered in the use of a complete single protocol. Further, printers functions evolve year by year. Once a standard protocol has been prescribed, addition of a new function becomes difficult.

SUMMARY OF THE INVENTION

It is therefore an object of the invention to provide an image processing system and an image output processing, which facilitate revision of a protocol after prescription of the protocol while ensuring compatibility between a plurality of vendors.

In order to achieve the above object, according to the invention, there is provided an image processing method, performed by an image supply device storing image data and an image output device performing image processing with respect to the image data which are connected via a communication path through which the image data is communicated, the method comprising steps of:

generating a control information item including a script for the image processing which is described by a markup language; and communicating the control information item between the image supply device and the image output device, the communicating step comprising:

interpreting a control protocol for communicating the control information item, by a first entity which executes processing for a first hierarchic layer of a communication protocol;

interpreting a management protocol for managing an image data file including the image data, by a second entity which executes processing for a second hierarchic layer of the communication protocol which is lower than the first hierarchic layer;

controlling a physical layer of the communication path, by a third entity which executes processing for a third hierarchic layer of the communication protocol which is lower than the second hierarchic layer; and translating a command in the control information item between the control protocol and the management protocol.

In such a configuration, the first entity can process an image through use of the control information item by merely changing the second entity and regardless of the type of the communication path and the type of the third entity.

Consequently, the vendor of the image supply device can form the first entity without awareness of the type of a communication path adopted by each vendor of the image output device. Control information of the same type can be exchanged between the image supply device and respective image output devices by combination of the formed first entity with the second entity corresponding to the selected communication path.

Similarly, the vendor of the image output device can exchange the control information of the same type between the image output device and the respective image supply devices by combining the thus-formed first entity with the second entity corresponding to the selected communication path. Therefore, compatibility of control information items pertaining to image processing can be ensured for a plurality of vendors.

Further, the control information item is described in the markup language. Therefore, control information is text-based information and is easy to read and also susceptible to addition or correction after the protocol prescription. When a desire arises for addition or correction of the control information pertaining to image processing after the information has been specified, the only requirement is substantially to amend the first entity, thereby reducing the scale of addition or correction operation.

Preferably, the management protocol is one of a picture transfer protocol (PTP) or a mass storage class of a universal serial bus (USB).

In such a configuration, since known entities can be utilized as the second and third entities, an image processing system can be constituted within a short time period. Further, addition or correction of the protocol after prescription becomes easy.

Preferably, the third entity controls a universal serial bus (USB).

Here, it is preferable that a still image capture device class is used for the USB.

In such a configuration, an existing entity can be utilized as the third entity.

Preferably, the second entity manages the image data file through use of a predetermined file system.

As a result of adoption of a known file system, known entities can be utilized as the second and third entities corresponding to protocols lower than the image data file management protocol.

Preferably, the third entity controls one of a wireless local area network (LAN) and a peer to peer wireless data communication.

In such a configuration, a known entity can be utilized as the third entity.

According to the invention, there is also provided an image processing system, comprising:

an image supply device, operable to store image data; and an image output device, connected to the image supply device via a communication path through which the image data is communicated, and operable to perform image processing with respect to the image data, wherein each of the image supply device and the image output device comprises:

a communication controller, operable to communicate, between the image supply device and the image output device, a control information item including a script for the image processing which is described by a markup language;

a first entity, operable to execute processing for a first hierarchic layer of a communication protocol, and to interpret a control protocol for communicating the control information item;

a second entity, operable to execute processing for a second hierarchic layer of the communication protocol of the communication protocol which is lower than the first hierarchic layer, and to interpret a management protocol for managing an image data file including the image data;

a third entity, operable to execute processing for a third hierarchic layer of the communication protocol of the communication protocol which is lower than the second hierarchic layer, and to control a physical layer of the communication path; and a translator, which translates a command in the control information item between the control protocol and the management protocol.

According to the invention, there is also provided an image output device, connected to an image supply device storing image data via a communication path, the image output device comprising:

a communication controller, operable to communicate, between the image supply device and the image output device, a control information item including a script for the image processing which is described by a markup language;

a first entity, operable to execute processing for a first hierarchic layer of a communication protocol, and to interpret a control protocol for communicating the control information item;

a second entity, operable to execute processing for a second hierarchic layer of the communication protocol of the communication protocol which is lower than the first hierarchic layer, and to interpret a management protocol for managing an image data file including the image data;

a third entity, operable to execute processing for a third hierarchic layer of the communication protocol of the communication protocol which is lower than the second hierarchic layer, and to control a physical layer of the communication path; and a translator, which translates a command in the control information item between the control protocol and the management protocol.

According to the invention, there is also provided a computer program product comprising a computer program which causes a computer to serve as the communication controller, the first entity, the second entity, the third entity, and the translator in the above image output device.

According to the invention, there is also provided an image supply device, connected to an image output device performing image processing via a communication path, the image supply device comprising:

a storage, which stores image data to be subjected to the image processing;

a communication controller, operable to communicate, between the image supply device and the image output device, a control information item including a script for the image processing which is described by a markup language;

a first entity, operable to execute processing for a first hierarchic layer of a communication protocol, and to interpret a control protocol for communicating the control information item;

a second entity, operable to execute processing for a second hierarchic layer of the communication protocol of the communication protocol which is lower than the first hierarchic layer, and to interpret a management protocol for managing an image data file including the image data;

a third entity, operable to execute processing for a third hierarchic layer of the communication protocol of the communication protocol which is lower than the second hierarchic layer, and to control a physical layer of the communication path; and a translator, which translates a command in the control information item between the control protocol and the management protocol.

According to the invention, there is also provided a computer program product comprising a computer program which causes a computer to serve as the communication controller, the first entity, the second entity, the third entity, and the translator in the above image supply device.

According to the invention, there is also provided an image processing method, performed by an image supply device storing image data and an image output device performing image processing with respect to the image data which are connected via a communication path through which the image data is communicated, the method comprising steps of:

generating a control information item including a script for the image processing which is described by a markup language; and communicating the control information item between the image supply device and the image output device, the communicating step comprising:

interpreting a control protocol for communicating the control information item, by a first entity which executes processing for a first hierarchic layer of a communication protocol;

selecting one of second entities each executes processing for a second hierarchic layer of the communication protocol which is lower than the first hierarchic layer;

selecting one of third entities each executes processing for a third hierarchic layer of the communication protocol which is lower than the second hierarchic layer;

interpreting a management protocol for managing an image data file including the image data, by the selected one of the second entities;

controlling a physical layer of the communication path, by the selected one of the third entities; and translating a command in the control information item between the control protocol and the management protocol.

In such a configuration, it is easy to conduct addition or correction of control information pertaining to the image processing after the protocol prescription, while compatibility of control information pertaining to image processing is ensured for a plurality of vendors. Further, since a plurality of second and third entities are provided as layers located at levels lower than the first entity, the control information item can be exchanged through use of any one of a plurality of combinations of image data file management protocols with the communication path Preferably, the management protocol is one of a picture transfer protocol (PTP) or a mass storage class of a universal serial bus (USB).

In such a configuration, since known entities can be utilized as the second and third entities, an image processing system can be constituted within a short time period. Further, addition or correction of the protocol after prescription becomes easy.

Preferably, the selected one of the third entities controls a universal serial bus (USB).

Here, it is preferable that a still image capture device class is used for the USB.

In such a configuration, a known entity can be utilized as the third entity.

Preferably, the selected one of the second entities manages the image data file through use of a predetermined file system.

As a result of adoption of a known file system, known entities can be utilized as the second and third entities.

Preferably, the selected one of the third entities controls one of a wireless local area network (LAN) and a peer to peer wireless data communication.

In such a configuration, a known entity can be utilized as the third entity.

Here, it is preferable that the selected one of the second entities is valid in both of the image supply device and the image output device.

In such a configuration, an appropriate combination of the second entity with the third entity can be established.

It is also preferable that the selecting step is performed in accordance with a state of the communication path.

In such a configuration, even when problems have arisen in the selected second or third entity, exchange of control information pertaining to the image processing can be continued by utilization of another second or third entity. Therefore, the chance of reliable performance of image output becomes higher.

Here, it is further preferable that the selecting step is performed based on a priority table such that one of the second entities and one of the third entities having respectively a relatively higher order in the priority table are selected prior to ones having a relatively lower order in the priority table.

In such a configuration, second and third entities are selected in accordance with preset priorities. As a result, the second and third entities can be selected from the user's desired viewpoints, such as communication speed and reliability.

According to the invention, there is also provided an image processing system, comprising:
an image supply device, operable to store image data; and
an image output device, connected to the image supply device via a communication path through which the image data is communicated, and operable to perform image processing with respect to the image data,
wherein each of the image supply device and the image output device comprises:
  a communication controller, operable to communicate, between the image supply device and the image output device, a control information item including a script for the image processing which is described by a markup language;
  a first entity, operable to execute processing for a first hierarchic layer of a communication protocol, and to interpret a control protocol for communicating the control information item;
  a plurality of second entities, each operable to execute processing for a second hierarchic layer of the communication protocol of the communication protocol which is lower than the first hierarchic layer, and to interpret a management protocol for managing an image data file including the image data;
  a plurality of third entities, each operable to execute processing for a third hierarchic layer of the communication protocol of the communication protocol which is lower than the second hierarchic layer, and to control a physical layer of the communication path;
  a selector, which selects one of the second entities and a third entities; and
  a translator, which translates a command in the control information item between the control protocol and the management protocol interpreted by the selected one of the second entities.

According to the invention, there is also provided an image output device, connected to an image supply device storing image data via a communication path, the image output device comprising:
  a communication controller, operable to communicate, between the image supply device and the image output device, a control information item including a script for the image processing which is described by a markup language;
  a first entity, operable to execute processing for a first hierarchic layer of a communication protocol, and to interpret a control protocol for communicating the control information item;
  a plurality of second entities, each operable to execute processing for a second hierarchic layer of the communication protocol of the communication protocol which is lower than the first hierarchic layer, and to interpret a management protocol for managing an image data file including the image data;
  a plurality of third entities, each operable to execute processing for a third hierarchic layer of the communication protocol of the communication protocol which is lower than the second hierarchic layer, and to control a physical layer of the communication path;
  a selector, which selects one of the second entities and a third entities; and
  a translator, which translates a command in the control information item between the control protocol interpreted by the first entity and the management protocol interpreted by the selected one of the second entities.

According to the invention, there is also provided a computer program product comprising a computer program which causes a computer to serve as the communication controller, the first entity, the second entity, the third entity, the selector, and the translator in the above image output device.

According to the invention, there is also provided an image supply device, connected to an image output device performing image processing via a communication path, the image supply device comprising:
  a storage, which stores image data to be subjected to the image processing;
  a communication controller, operable to communicate, between the image supply device and the image output device, a control information item including a script for the image processing which is described by a markup language;
  a first entity, operable to execute processing for a first hierarchic layer of a communication protocol, and to interpret a control protocol for communicating the control information item;
  a plurality of second entities, each operable to execute processing for a second hierarchic layer of the communication protocol of the communication protocol which is lower than the first hierarchic layer, and to interpret a management protocol for managing an image data file including the image data;
  a plurality of third entities, each operable to execute processing for a third hierarchic layer of the communication protocol of the communication protocol which is lower than the second hierarchic layer, and to control a physical layer of the communication path;

a selector, which selects one of the second entities and a third entities; and a translator, which translates a command in the control information item between the control protocol interpreted by the first entity and the management protocol interpreted by the selected one of the second entities.

According to the invention, there is also provided a computer program product comprising a computer program which causes a computer to serve as the communication controller, the first entity, the second entity, the third entity, and the translator in the above image supply device.

BRIEF DESCRIPTION OF THE DRAWINGS

The above objects and advantages of the present invention will become more apparent by describing in detail preferred exemplary embodiments thereof with reference to the accompanying drawings, wherein:

FIG. 9 is a view showing an example XML script for an image output job start command employed in the first embodiment;

FIG. 10 is a view showing an example XML script for a file acquisition command employed in the first embodiment;

FIG. 13 is a view for describing a directory structure of the Digital Print Order Form (DPOF) standard;

FIG. 14 is a view showing an example of a job specification file AUTPRINT.MRK of the DPOF standard;

FIG. 17 is a view showing an example XML script for an object ID acquisition command employed in the second embodiment;

FIG. 18 is a view showing an example XML script for a response to the object ID acquisition command employed in the second embodiment;

FIG. 19 is a view showing an example XML script for a file information acquisition command employed in the second embodiment;

FIG. 20 is a view showing an example XML script for a response to the file information acquisition command employed in the second embodiment;

FIG. 24 is a view showing an example XML script for job status notification employed in the third embodiment;

FIG. 25 is a view showing an example XML script for device status notification employed in the third embodiment;

FIG. 26 is a view showing an example XML script for a print job start command employed at the time of resumption of a job in the third embodiment;

DETAILED DESCRIPTION OF THE INVENTION

Preferred embodiments of the invention will be described hereinbelow with reference to the accompanying drawings.

Figure 1:
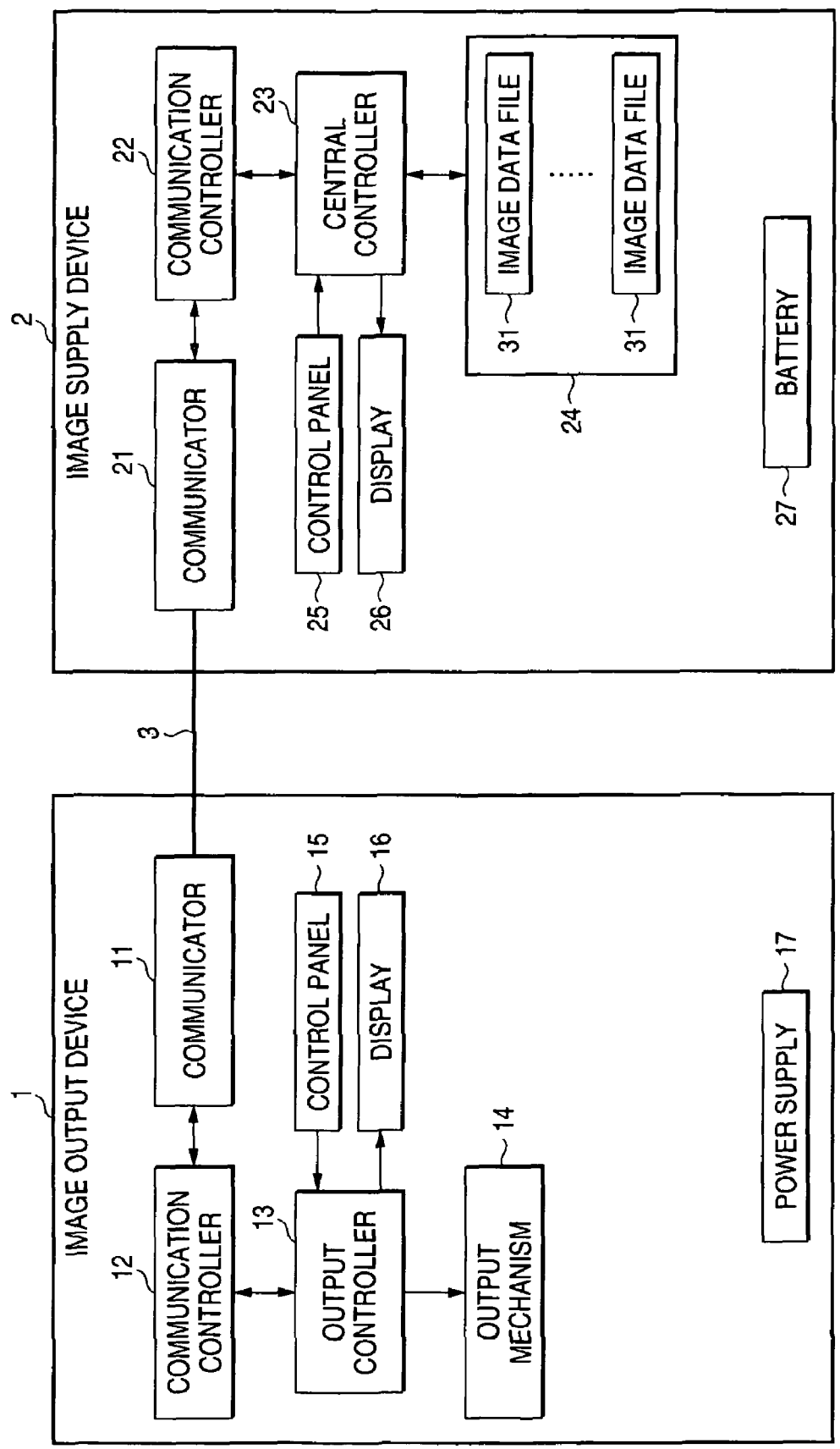
FIG. 1 is a block diagram showing the configuration of an image output system according to a first embodiment of the invention.

FIG. 1 shows an image output system according to a first embodiment of the invention. This image output system can be taken as one type of so-called direct print system. In this embodiment, an image output device 1 is a device for outputting images on the basis of image data. The image output device 1 is embodied in the form of a printer or the like which prints images on paper on the basis of image data. An image supply device 2 is a device capable of storing image data and transmitting image data as required. The image supply device 2 is embodied in the form of a digital still camera or the like which stores captured images on a predetermined storage medium as image data.

A communication channel 3 is a transmission medium for connecting the image output device 1 to the image supply device 2. The communication channel 3 is not limited to a cable communication channel, and a wireless communication channel may also be employed. In the first embodiment, a universal serial bus (USB) cable is used as the communication channel 3. In a case where the communication channel 3 is a cable communication channel, an unillustrated connector is provided on the image output device 1 and the image supply device 2, thereby connecting connectors provided on respective ends of the cable of the communication channel 3 to connectors of the devices 1 and 2.

In the image output device 1 shown in FIG. 1, a communicator 11 is a circuit for communicating various information items as electrical signals via the communication channel 3. A communication controller 12 is a circuit or device which controls the communicator 11 to exchange information with a mating device in accordance with various protocols. The communicator 11 and the communication controller 12 exchange, by way of the communication channel 3, control information pertaining to an image output as a series of scripts described in markup languages.

An output controller 13 is a circuit or device which controls and monitors an output mechanism 14, thereby controlling image output processing (i.e., print processing in a case where the image output device 1 is a printer). In the first embodiment, the output controller 13 controls a processing flow pertaining to an image output The output mechanism 14 is a mechanical and/or electrical constitution section for outputting images. In the case of a printer, the output mechanism 14 corresponds to a print mechanism and a paper feed mechanism. The output controller 13 and the output mechanism 14 output an image on the basis of image data.

A control panel 15 is a circuit or device which is to be manipulated by the user and outputs a signal in response to manipulation. Various switches or a touch panel is used as the control panel 15, as required. A display 16 is a device for display various information items. Various indicators or a liquid-crystal display is used as the display 16, as required.

A power supply 17 is a circuit which is connected to commercial power or an AC/DC converter and feeds supplied power to internal circuits.

In the image supply device 2 shown in FIG. 1, a communicator 21 is a circuit which exchanges various information items in the form of electrical signals by way of the communication channel 3. A communication controller 22 is a circuit or device which controls the communicator 21 to exchange information with a mating device in accordance with various protocols. The communicator 21 and the communication controller 22 exchange, by way of the communication channel 3, control information pertaining to an image output as a series of scripts described in markup languages.

A central controller 23 is a circuit or device which performs various processing operations while exchanging various information items with circuits or devices having various functions, such as the communication controller 22 and a storage medium 24.

The storage medium 24 is a device which stores at least one image data file 31. The image data file 31 is a file which includes image data pertaining to, e.g., images captured by a digital camera, or other images. The format of the image data is, e.g., a JPEG (Joint Photographic Experts Group) format or an EXIF (Exchangeable Image File) format.

Semiconductor memory, a memory card using semiconductor memory, a magnetic storage medium, an optical storage medium, or an electro-optical storage medium is used as the storage medium 24. The storage medium may be fixed or removably attached to the image supply device 2.

A control panel 25 is a circuit or device which is to be manipulated by the user and outputs a signal in response to manipulation. Various switches or a touch panel is used as the control panel 25, as required. A display 26 is a device for display various information items, such as images based on image data. Various indicators or a liquid crystal display is used as the display 26, as required.

A battery 27 supplies power to internal circuits of the image supply device 2. A storage battery or a disposable battery is used as the battery 27. When the image supply device 2 is a device requiring portability, the battery 27 is provided as a power source. When the image supply device 2 is a device which does not require portability, a power supply as well as the power supply. 17 of the image output device 1, may be provided as a power source.

Figure 2:
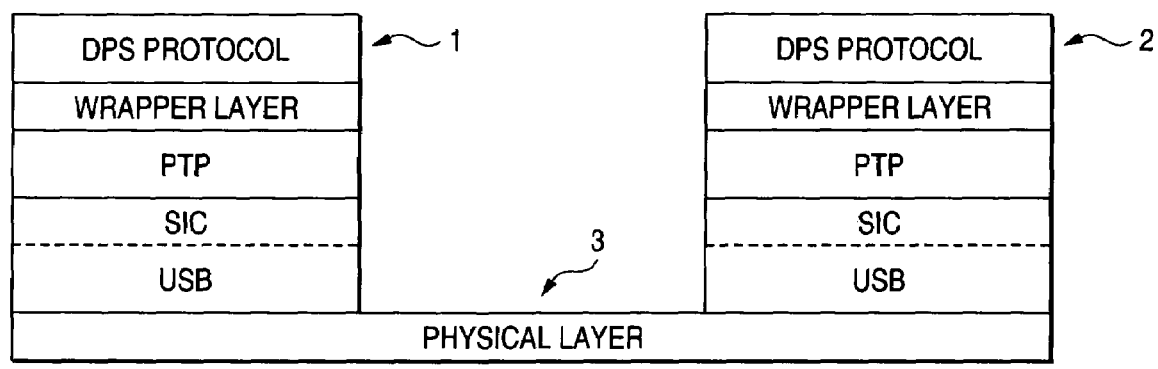
FIG. 2 is a view showing an example protocol used between an image output device and an image supply device in the image output system of the first embodiment.

FIG. 2 shows an example protocol used between the image output device 1 and the image supply device 2.

As shown in FIG. 2, in the first embodiment, the communication channel 3; that is, a USB cable, is used as a physical layer. In the image output device 1 and the image supply device 2, both pertaining to the first embodiment, a USB layer is adopted as a layer for controlling the physical layer. A still image capture device class (SIC) is used as a USB class. As a result, a data transmission path is realized. In relation to the USB standards, USB 1.1 and USB 2.0 are currently in use. However, the next version or subsequent versions, which would be proposed in future, may also be used, or a communication standard equivalent to the USB may also be used instead. When a USB is used for the communication channel 3, the image output device 1 serves as a host, and the image supply device 2 serves as a device.

A picture transfer protocol (PTP) is used at a higher level for specifying control of a digital still picture device (DSPD) from the outside or transfer of image data to the outside of the digital still picture device (DSPD). "PIMA15740:2000" proposed by Photographic and Imaging Manufacturers Association, Inc is available as a set of PTP standards. Here, PTP is a protocol which offers a communications system for exchanging image data between DSPDs. In relation to the PTP, an object (e.g., an image data file) stored in a storage is specified not by a path but by an object ID (i.e., an object handle).

In the first embodiment, a direct print service (hereinafter abbreviated as "DPS") protocol is used at a higher level of the PTP for supplying image data stored in the image supply device 2, such as a digital camera, directly to the image output device 1, such as a printer, by way of the communication channel 3, to thereby perform printing operation. In relation to the DPS protocol, control information about an image output is exchanged as a series of scripts described in an markup language (here, XML: Extensible Markup Language) between the image output device 1 and the image supply device 2 by way of the communication channel 3.

Control information pertaining to an image output includes various commands pertaining to image output processing, responses to the commands, and notification of statuses of devices. The script includes only control information and does not include any image data which are objects of image output operation. Specifically, the script includes information about a location for storing image data files, but does not include image data.

A low-level layer of the DPS protocol is not limited to the PTP. Therefore, a wrapper layer is provided between the DPS protocol and a low-level layer (here a PTP) for achieving consistency between the DPS protocol and low-level layers of a plurality of types.

In the first embodiment, among the previously-described protocols, the physical layer is embodied by the communicator 11, the communication channel 3, and the communicator 21. The USB layer is embodied by the communicator 11 and the communicator 21. The PTP layer, the wrapper layer, and the DPS protocol layer are realized by the communication controller 12 and the communication controller 22.

Specifically, each of the communication controllers 12, 22 serves as a first entity for interpreting a DPS protocol, which is an image output control protocol to be used for exchanging control information pertaining to image output described in markup languages; a second entity for interpreting a PTP, which is an image data file management protocol located at a level lower than the first entity, and used for managing the image data stored in the image supply device 2 and transferring the image data to the image output device 1; and a third entity which is located at a level lower than the second entity for controlling a physical layer of the communication channel 3. Here, the term "entity" refers to a substance for realizing a communications function relating to a certain protocol.

The wrapper layers in the respective communication controllers 12, 22 effect a protocol conversion between an image output control protocol and an image data file management protocol of the first entity, both protocols being suitable for the type of the image data file management protocol of the second entity. Namely, the wrapper layers of the respective communication controllers 12, 22 replace a high-level protocol (DPS protocol) command with a low-level protocol (PTP) command, as required.

Figure 3:
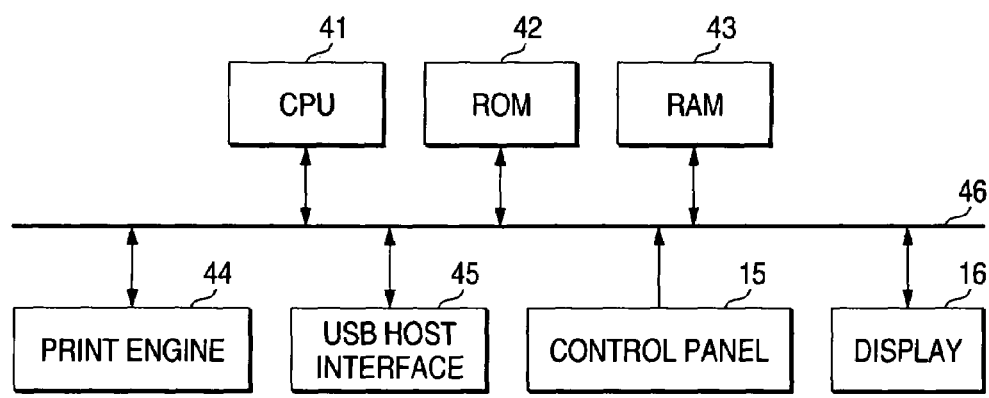
FIG. 3 is a block diagram showing an exemplary configuration of a printer serving as the image output device in the image output system of the first embodiment.

FIG. 3 shows an example configuration of a printer serving as the image output device 1. In the printer, a CPU 41 is a device which executes a program, to thereby perform processing described in the program. A ROM 42 is a memory which stores programs and data in advance. A RAM 43 is a memory which temporarily stores a program and data when executing the program.

A program to be used for producing print control data from image data and a program for effecting communication in accordance with a DPS protocol and an image transfer protocol are stored, as programs to be executed by the CPU 41, in the ROM 42 or another unillustrated storage medium.

A print engine 44 is a circuit or device which controls the output mechanism 14, to thereby perform print processing in accordance with the print control data supplied from the CPU 41.

A USB host interface 45 corresponds to the communicator 11 shown in FIG. 1 and is a host interface circuit which is specified by the USB.

A bus 46 is a signal channel for interconnecting the CPU 41, the ROM 42, the RAM 43, the print engine 44, the USB host interface 45, the control panel 15, and the display 16. The number of buses 46 and a topology of connection of the CPU 41 and the print engine 44 to the bus 46 are not limited to those shown in FIG. 3.

The control panel 15 and the display 16, which are shown in FIG. 3, are analogous to those shown in FIG. 1.

Figure 4:
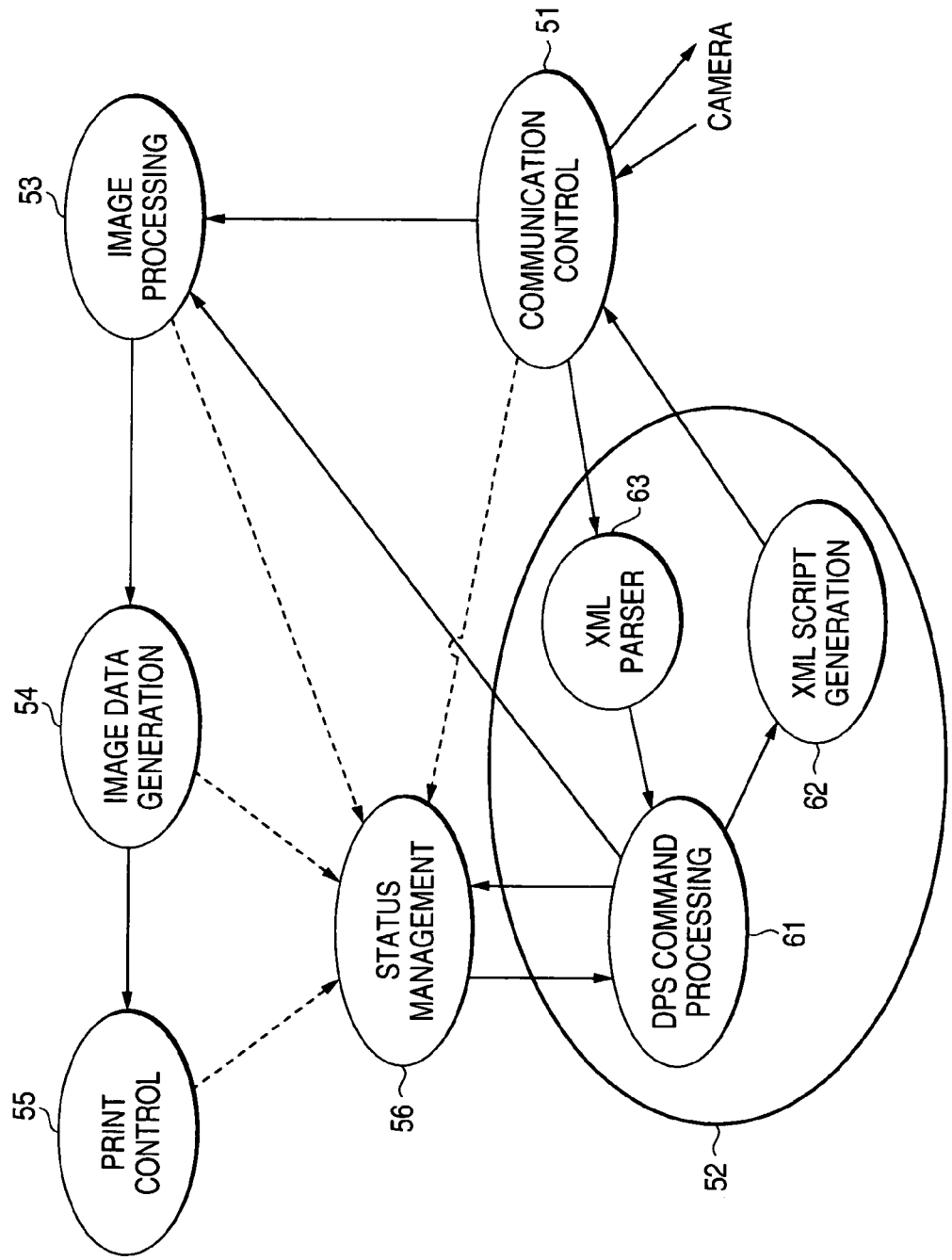
FIG. 4 is a view showing relationships among a plurality of functions of the image output device in the image output system of the first embodiment.

FIG. 4 shows relationships between a plurality of functions of the image output device 1. A communication control function 51 is a function for effecting communication control under an image transfer protocol.

A DPS protocol processing function 52 includes a DPS command processing function 61, which produces and interprets control information specified by the DPS protocol; an XML script generating function 62, which produces an XML script corresponding to the control information; and an XML server 63, which subjects to syntax analysis the control information described in an XML.

The XML server 63 may be designed to enable analysis of all syntaxes in an XML or analysis of only syntaxes used in the DPS protocol. In such a case, the only requirement for the XML server 63 is to be able to discern only a tag required to describe an XML script related to the DPS protocol.

The XML script generating function 62 may be set so as to previously store templates of XML scripts in the ROM 42 according to the types of control information items, such as commands, and to generate an XML script showing control information by editing the template.

An image processing function 53 is a function for changing the format of image data. A print data generating function 54 is a function for generating print control data from image data whose format has been changed. A print control function 55 is a function for performing print processing in accordance with the print control data.

A status management function 56 is a function for monitoring processing statuses of the previously-descried respective functions. The functions are realized by the CPU 41 executing the program.

Figure 5:
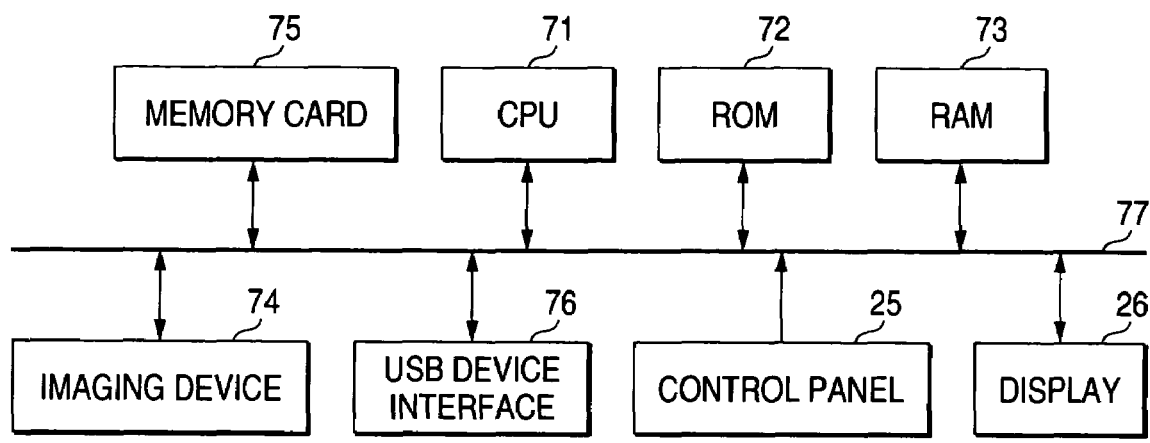
FIG. 5 is a block diagram showing an exemplary configuration of a digital camera serving as the image supply device in me image output system of the first embodiment.

FIG. 5 shows an example configuration of a digital camera serving as the image supply device 2. In the digital camera, a CPU 71 is a device which executes a program, to thereby perform processing described by the program. A ROM 72 is a memory for storing programs and data in advance. A RAM 73 is a memory for temporarily storing a program and data when executing the program.

A program to be used for controlling individual sections during photographing operation and a program for effecting communication and management of image data in accordance with a DPS protocol and an image transfer protocol are stored, as programs to be executed by the CPU 71, in the ROM 72 or another unillustrated storage medium.

An imaging device 74 images a subject in accordance with a command from the CPU 71 and stores obtained image data into a memory card 75.

The memory card 75 corresponds to the storage medium 24 shown in FIG. 1 and is a storage medium for storing image data obtained through imaging. Semiconductor memory or a magnetic recording device, which is fixed in a device, may be used in place of the memory card 75.

A USB device interface 76 corresponds to the communicator 21 shown in FIG. 1 and is a device interface circuit specified by the USB.

A bus 77 is a signal channel for interconnecting the CPU 71, the ROM 72, the RAM 73, the imaging device 74, the memory card 75, the USB device interface 76, the control panel 25, and the display 26. The number of buses 77 and the topology of connection of the CPU 71 to the bus 77 are not necessarily limited to those shown in FIG. 5.

The control panel 25 and the display 26, which are shown in FIG. 5, are analogous to those shown in FIG. 1.

Figure 6:
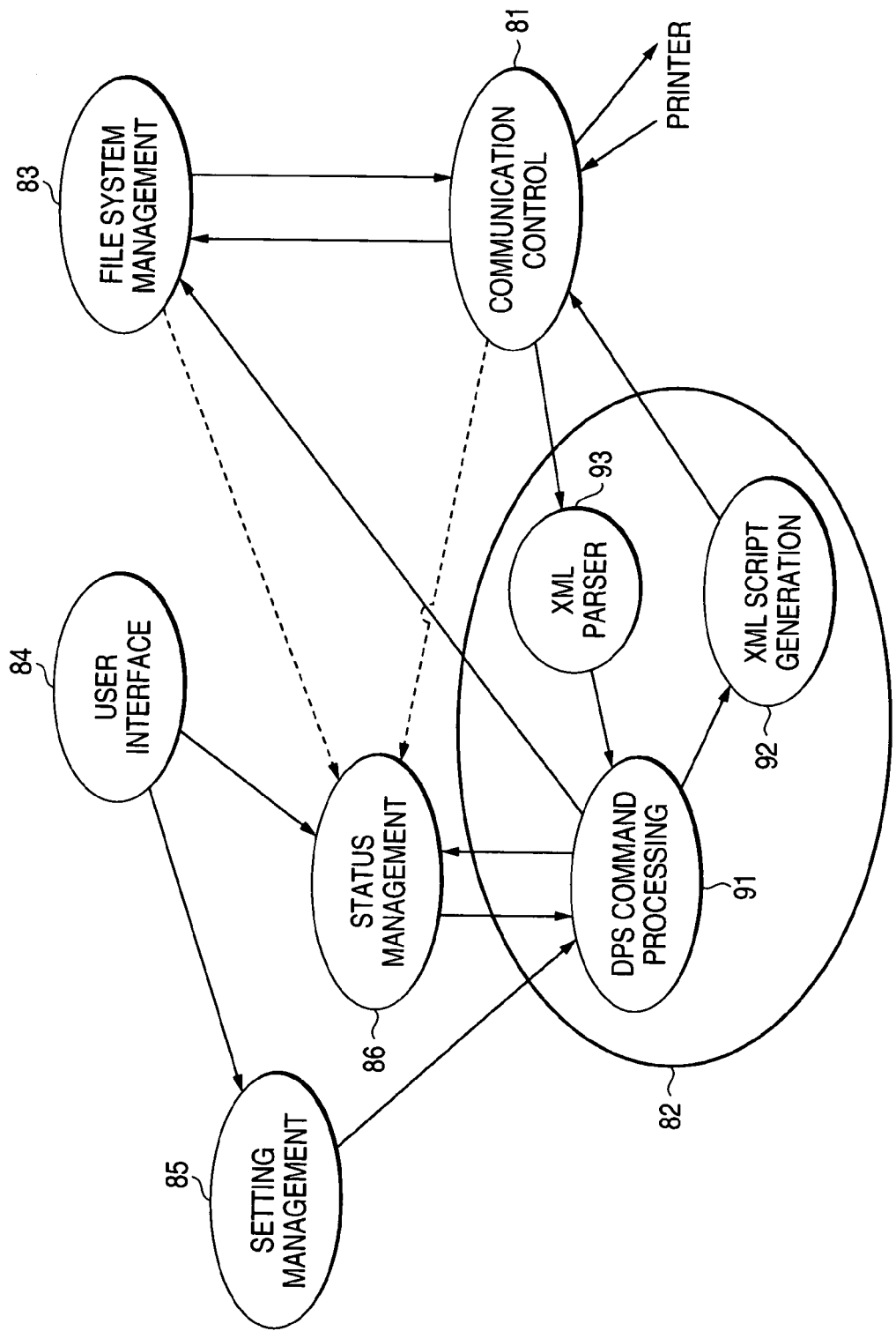
FIG. 6 is a view showing relationships among a plurality of functions of the image supply device in the image output system of the first embodiment.

FIG. 6 shows relationships between a plurality of functions of the image supply device 2. A communication control function 81 is a function for effecting communication control under an image transfer protocol.

A DPS protocol processing function 82 includes a DPS command processing function 91, which produces and interprets control information specified by the DPS protocol; an XML script generating function 92, which produces an XML script corresponding to the control information; and an XML server 93, which subjects to syntax analysis the control information described in an XML.

The XML server 93 may be designed to enable analysis of all syntaxes in an XML or analysis of only syntaxes used in the DPS protocol. In such a case, the only requirement for the XML server 93 is to be able to discern only a tag required to describe an XML script related to the DPS protocol.

The XML script generating function 92 may be set so as to previously store templates of XML scripts in the ROM 72 according to the types of control information items, such as commands, and to generate an XML script showing control information by editing the template.

A file system management function 83 is a function which stores image data as an image data file 31 in the memory card 75 serving as the storage medium 24, in accordance with a predetermined directory structure and a file structure.

A user interface function 84 is a function for accepting operation of the control panel 25 performed by the user and displaying various information items on the display 26.

A setting management function 85 is a function for setting requirements, such as print processing, in accordance with the user's operation. A status management function 86 is a function for monitoring processing statuses of the aforementioned functions. These functions are realized by the CPU 71 executing the program.

Figure 7:
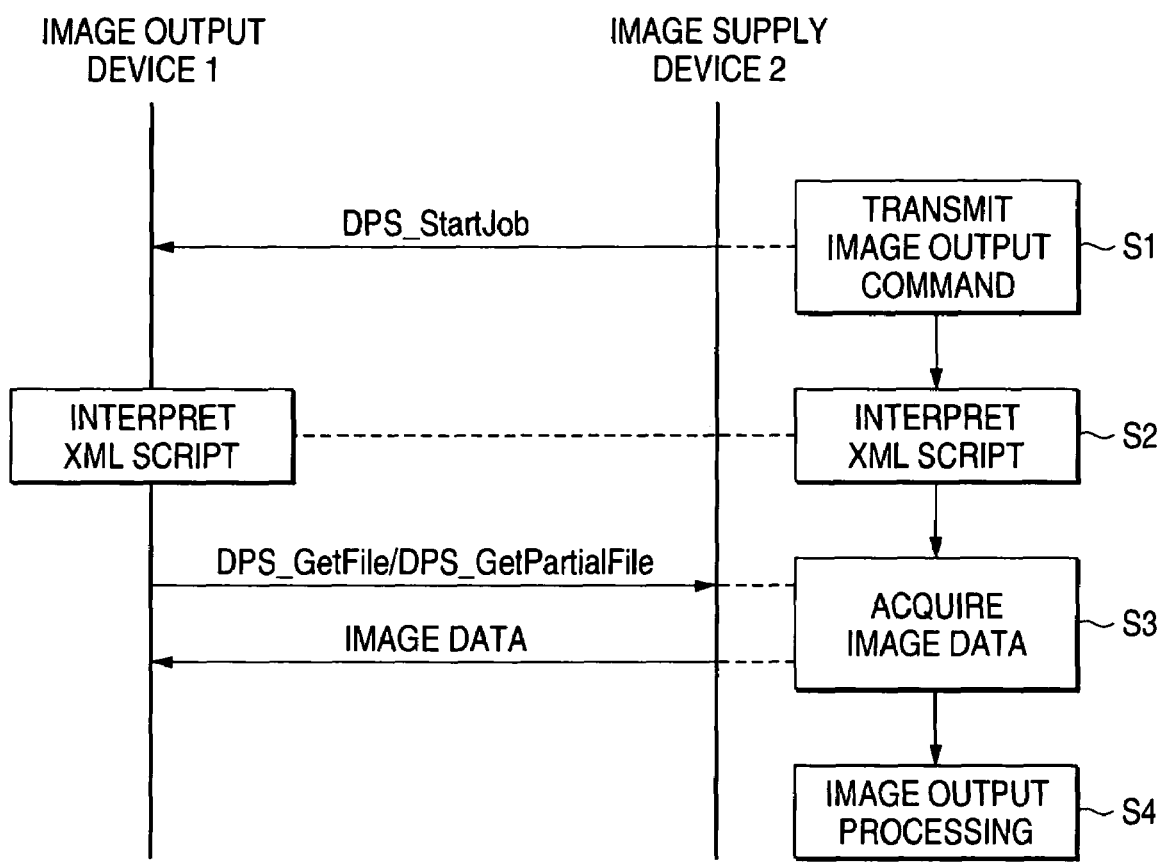
FIG. 7 is a view for describing image output processing on the DPS protocol level in the image output system of the first embodiment.
Figure 8:
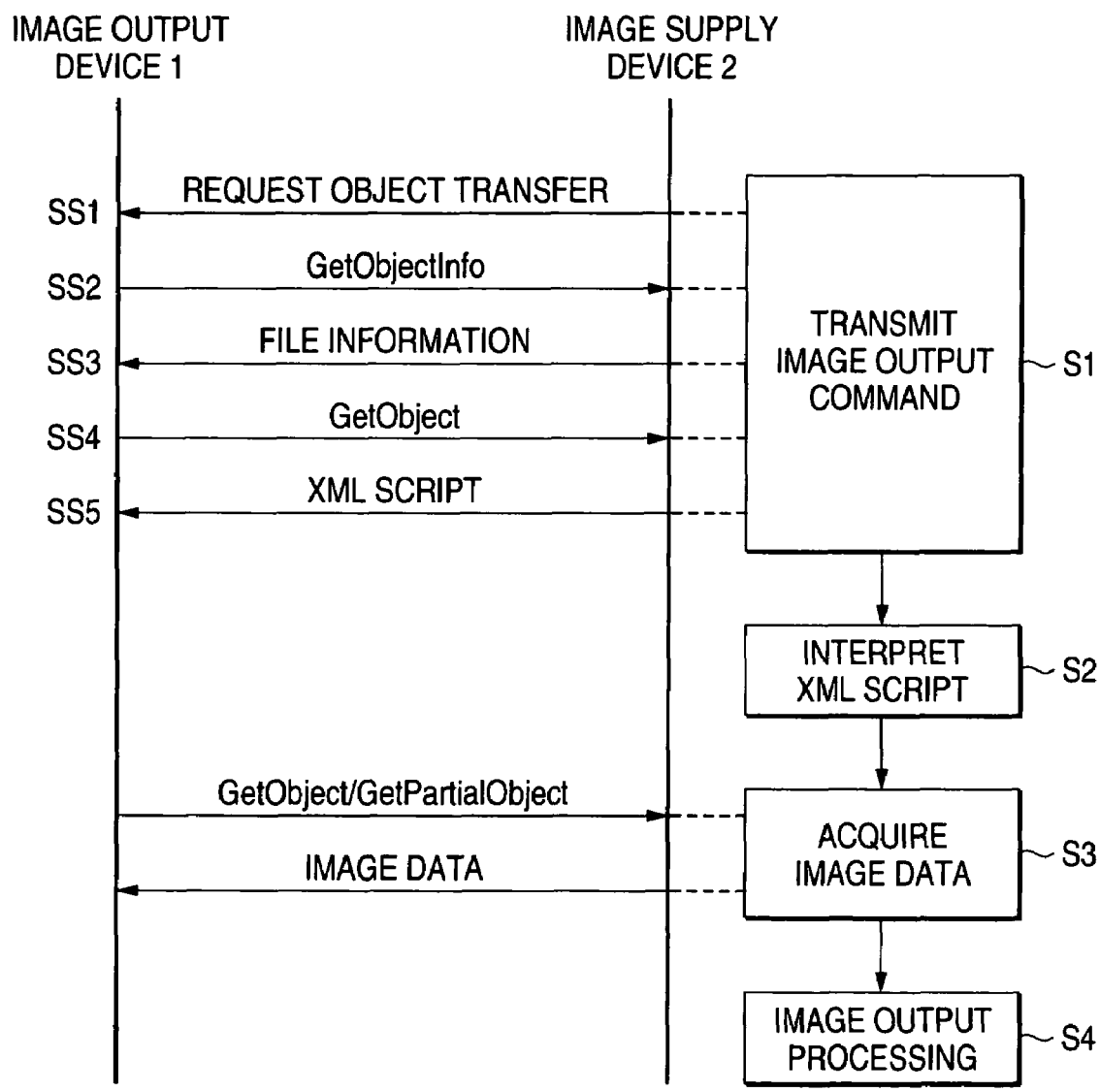
FIG. 8 is a view for describing image output processing on the image transfer protocol level in the image output system of the first embodiment.

Operations of the individual devices in the system will now be described. FIG. 7 shows image output processing at the DPS protocol level. FIG. 8 shows image output processing at the image transfer protocol level.

First, when a predetermined operation has been performed by way of, e.g., the control panel 25, the image supply device 2 transmits an image output job start command to the image output device 1 by way of the communication channel 3 (step S1).

At that time, in the image supply device 2, the communication controller 22 produces and transmits an XML script of an image output job start command "DPS_StartJob" in accordance with the DPS protocol. Here, image data which are objects of image output are specified within the XML script.

The image output job start command "DPS_StartJob" includes the next job requirement setting information and image output information.

As required, the job requirement setting information include quality information for setting the quality of an image output pertaining to a current job, paper type information pertaining to a current print job, paper size information pertaining to a current print job, image format information, image optimization setting information, and page layout information.

As required, the image input information include cropping area information for specifying an area required when cropping operation is performed, an object ID of image data, copy number information pertaining to each image, a job ID unique to each job, path information pertaining to image data or a job specification file, and repeated supply count information pertaining to each image data (i.e., information showing the number of times identical image data are consecutively supplied to the image output device 1).

FIG. 9 shows an example XML script of an image output job start command "DPS_StartJob". A job tag is a tag to be used for specifying one job. Here, when a reference is made to an XX tag, the tag designates both a <XX> tag and a </XX> tag (the same also applies to any counterparts in the following descriptions). A jobConfig tag and a printInfo tag are arranged below the job tag. The jobConfig tag is for specifying job requirement setting information.

In the script shown in FIG. 9, a quality tag, a paperSize tag, a paperType tag, a fileType tag, a date tag, a fileName tag, an imageOptimize tag, and a layoutItem tag are arranged below the jobConfig tag.

The quality tag is for specifying quality information, such as a standard, a draft, or a fine. The papersize tag is for specifying paper size information pertaining to a current job, such as an A4-size. A paper size is specified by a predetermined numeral (e.g., 02010000). The paperType tag is for specifying paper type information pertaining to a current job, such as standard paper or photographic paper. The paper size is specified by a predetermined numeral (e.g., 03020000). The fileTyp tag is for specifying image format information pertaining to a current job, such as EXIF, JPEG, TIFF, and GIF, and an image format is specified by a predetermined numeral (e.g., 04150000).

The date tag is for specifying whether or not date information specified by a printInfo tag is to be printed. The filename tag is for specifying whether or not the file path information specified by the printInfo tag is to be printed. The imageOptimize tag is for specifying image optimization setting information showing whether or not image optimization is to be effected. The layoutItem tag is for specifying a page layout of a current job. An image format is specified by a predetermined numeral (e.g., 08010000).

The printInfo tag is for specifying image output information. An image tag is arranged at a position lower than the printInfo tag. The image tag is for specifying an image which is an object of image output In the script shown in FIG. 9, an imageID tag and an imageDate tag are arranged at a position lower than the image tag. The imageID tag is for specifying an object ID of image data which are objects of image output. The imageDate tag is for designating a date to be printed beside an image.

The script shown in FIG. 9 includes only one image tag. However, in a case where a plurality of images are to be output, an image data object ID is specified for each of the plurality of images by the image tag. When a single image is to be output repetitively a plurality of times, a copies tag is arranged subsequent to an image tag of the image, whereby the number of times feeding operation to be repeated is specified.

A dps tag shown in FIG. 9 is a tag which shows an XML script pertaining to a DPS and takes, as an attribute, an URL (Uniform Resource Locator) which is a location at which name space information to be used for OPS is stored.

Logically, the communication controller 22 of the image supply device 2 transmits the XML script of the job start command in accordance with a DPS protocol. However, the communication controller 22 converts the XML script into a command of an image transfer protocol and processes that command on the image transfer protocol level.

Specifically, the communication controller 22 of the image supply device 2 first transmits a file transfer request command "RequestObjectTransfer" (step SS1) in accordance with the image transfer protocol. The command is transmitted to the image output device 1 by way of the USB layer and the physical layer.

In the image output device 1, the communication controller 12 transmits a command "GetObjectInfo" for inquiring an attribute of a file to be transferred upon receipt of the file transfer request command "RequestObjectTransfer" in accordance with the image transfer protocol (step SS2). The command is transmitted to the image supply device 2 by way of the USB layer and the physical layer.

In the image supply device 2, the communication controller 22 transmits file information about an XML script of a command "DPS_StartJob" (a file format, a file volume, or the like) upon receipt of a command "GetObjectInfo" in accordance with the image transfer protocol (step SS3). The file information is transmitted to the image output device 1 by way of the USB layer and the physical layer.

In the image output device 1, the communication controller 12 specifies the XML script upon receipt of the file information in accordance with the image transfer protocol, thereby transmitting a file acquisition command "GetObject" (step SS4). The file information is transmitted to the image supply device 2 by way of the USB layer and the physical layer.

In the image supply device 2, the communication controller 22 transmits a specified file (an XML script of a command "DPS_StartJob") upon receipt of the command "GetObject" in accordance with the image transfer protocol (step SS5). The file is transmitted to the image output device 1 by way of the USB layer and the physical layer.

In the image output device 1, the communication controller 12 receives the file in accordance with the image transfer protocol, thereby receiving the command "DPS_StartJob" at a DPS protocol layer.

Here, the image output device 1 is a printer shown in FIGS. 3 and 4. In a case where the image supply device 2 is a digital camera shown in FIGS. 5 and 6, communication under a DPS protocol is effected by the DPS protocol processing functions 52, 82 and communication control functions 51, 81. Communication under an image transfer protocol is performed between the communication control function 51 and the communication control function 81.

Next, the image output device 1 interprets an XML script of the acquired image output job start command (step S2), and image data which are objects of image output, the objects being described in the XML script, are acquired from the image supply device 2 (step S3).

In the first embodiment, after an image output job start command has been received from the image supply device 2, the image output device 1 controls a processing flow of the image output job. Specifically, the image output device 1 manages progress in image output processing, and information and image data, both being required for image output processing, are acquired from the image supply device 2, as required.

At that time, in the image output device 1, the communication controller 12 specifies an image data file 31 by an object ID (corresponding to an object ID in the PTP) described in the XML script in accordance with the DPS protocol, thereby issuing the file acquisition command "DPS_GetFile" of the XML script. An object ID in a PTP pertaining to a certain object and an object ID in the DPS protocol may be set to a single value or different values. When the object IDs have different values, the object ID of the DPS protocol and the object ID of the PTP are mapped, as necessary.

FIG. 10 shows an example XML script of the file acquisition command "DPS_GetFile" used in the first command. The getFileRequest tag is a tag showing a file acquisition command. The fileID tag and a buffPtr tag are arranged at positions lower than the getFileRequest tag. The fileID tag is for specifying an object ID of a file which is an object of acquisition. The buffPtr tag is for specifying a pointer of a buffer to be used for receiving the acquired file.

The communication controller 12 converts the file acquisition command "DPS_GetFile" of the DPS protocol into a file acquisition command "GetObject" of the image transfer protocol and then transmits the thus-converted command. The command is transmitted to the image supply device 2 by way of the USB layer and the physical layer.

In place of the file acquisition command "DPS_GetFile" to be used for acquiring all files, a partial file acquisition command "DPS_GetPartialFile" to be used for acquiring a part of a file may be transmitted several times, to thereby acquire the overall file. In such a case, the partial file acquisition command "DPS_GetPartialFile" is converted into a command "GetPartialObject" of the image transfer protocol.

In the image supply device 2, the communication controller 22 reads a file (i.e., an image data file 31) of a specified object ID upon receipt of the command "GetObject" in accordance with the image transfer protocol and transmits the file. The file is transmitted to the image output device 1 by way of the USB layer and the physical layer.

In the image output device 1, when the communication controller 12 has received the file in accordance with the image transfer protocol, the file is also considered to have been received by the DPS protocol layer.

Here, when the image output device 1 is the printer shown in FIGS. 3 and 4 and the image supply device 2 is the digital camera shown in FIGS. 5 and 6 the DPS protocol processing function 52 and the communication control function 51, both belonging to the image output device 1, and the communication control function 81 and the file system management function 83, both belonging to the image supply device 2, are used for acquiring the image data.

In the image output device 1, when the image data are acquired, an image based on the image data is output (step S4). At that time, in the image output device 1, the output controller 13 and the output mechanism 14 perform the image output processing.

Here, when the image output device 1 is the printer shown in FIGS. 3 and 4, the image processing function 53, the print data generating function 54, and the print control function 55 are used for image output processing.

As mentioned above, according to the first embodiment, the image output device 1 and the image supply device 2 communicate control information pertaining to image output as a series of scripts described in a markup language by way of the communication channel 3. As a result, correction of the protocol after prescription can be facilitated by utilization of extensibility of the syntax of a markup language while compatibility among a plurality of vendors is maintained.

According to the first embodiment, an XML which enables additional definition of a document type is used as a markup language. As a result, correction of the protocol after prescription can be facilitated.

According to the first embodiment, each of the communication controllers 12, 22 serves as a first entity for interpreting a DPS protocol to be used for exchanging control information pertaining to image output described in a markup language, a second entity which is located at a level lower than the first entity and interprets a PTP to be used for managing the image data file stored in the image supply device 2 and transferring the image data to the image output device 1; and a third entity which is located at a level lower than the second entity and controls a physical layer (a USB in this embodiment) of the communication channel 3. As a result, various existing protocols can be used at hierarchical levels lower than the PTP. When correction of a protocol pertaining to image output is desired after the protocol has been prescribed, the only requirement is to amend the DPS protocol, and hence the amount of correction can be reduced.

According to the first embodiment, the communication controllers 12, 22 convert the DPS protocol of the first entity into the image data file management transfer protocol or vice versa in accordance with the kind of image data file management transfer protocol of the second entity (PTP in the embodiment) at a wrapper layer. As a result, the wrapper layer absorbs a difference between the adopted image data file management transfer protocols. Hence, when correction of a protocol pertaining to image output is desired after having been prescribed, the only requirement is to amend the image output control protocol without involvement of any substantial corrections on the wrapper layer, and hence the amount of correction can be reduced.

According to the first embodiment, the output controller 13 of the image output device 1 controls the processing flow of image output operation. As a result, the volume of information processing to be performed by the image supply device 2 essentially does not increase. Hence, the present system can be embodied even when the image supply device has a low level of information processing performance.

According to the first embodiment, the communication controllers 12, 22 communicate, as control information pertaining to image output and in the form of a series of scripts described in a markup language, a control command for image output processing, a response to the control command, and notification of a status of the device (including a job status). As a result, a control command which is on a text basis and easy to read, a response to the control command, and notification of status of the device can be communicated, and the protocol can be made easy to correct after prescription while compatibility between a plurality of vendors is maintained.

According to the first embodiment, the communication controllers 12, 22 communicate, as a series of scripts described in a markup language, a script which does not include image data to be an object of image output and includes only control information pertaining to image output. As a result, the control information described in a markup language can be communicated independently of the data which are to become an object of image output, without modifying the format of data to be an object of image output from an existing format.

According to the first embodiment, the image output device 1 has an output mechanism 14 for outputting an image, and an output controller 13 which produces, from image data, control data to be used for controlling an output mechanism and controls the output mechanism on the basis of the control data. As a result, the image supply device 2 can be dispensed with a function for producing, from image data, control data to be used for controlling the output mechanism (e.g., a function included in a conventional printer driver used in a personal computer), and hence the image supply device 2 can be made inexpensive.

According to the first embodiment, when the XML server 63 of the image output device 1 is configured to determine only a tag required to describe the control information pertaining to image output from among the tags described in a markup language, the XML server 64 can be implemented by a small-amount circuit or program, thereby rendering the image output device 1 inexpensive.

According to the first embodiment, when the XML server 93 of the image supply device 2 is configured to determine only a tag required to describe the control information pertaining to image output from among the tags described in a markup language, the XML server 93 can be implement d by a small-amount circuit or program, thereby rendering the image supply device 2 inexpensive.

According to the first embodiment, the communication controllers 12, 22 store templates of scripts according to types of control information and produce scripts of control information from the templates. As a result, only portions for which templates have not been determined must be edited, thereby enabling generation of a script of control information within a short time period.

According to the first embodiment, when a predetermined operation has been performed by way of the control panel 25, the communication controller 22 and the communicator 21, both belonging to the image supply device 2, transmit an image output job start command to the image output device 1 as control information. Upon receipt of the image output job start command by way of the communication controller 12 and the communicator 11, the output controller 13 of the image output device 1 commences image output processing in accordance with the image output job start command. As a result, the image output can be performed by the user operating the control panel 25 of the image supply device 2. When the image supply device 2 has the user-friendly control panel 25, operability of the control panel 25 is improved.

According to the first embodiment, when the image data stored in the image supply device 2 are required during image output processing, the communication controller 12 of the image output device 1 transmits to the image supply device 2 a request for transmission of image data. Upon receipt of the request for transmission of the image data, the communication controller 22 of the image supply device 2 transmits the image data to the image output device 1. As a result, the only requirement for the image supply device 2 is to send the image data in accordance with the request from the image output device 1. Hence, the quantity of image processing operation of the image supply device 2 essentially does not increase, and the present system can be embodied even when the image supply device 2 has a low level of information processing performance.

The image output system of the first embodiment has a first entity for interpreting an image output control protocol as being located at a level higher than the third entity for controlling a physical layer of the communication channel, and the second entity for interpreting the image data file management protocol. Basically, regardless of the types of the communication channel and the third entity, an image can be output through use of control information pertaining to the image output suited for the DPS protocol through use of the first entity, by only changing the second entity.

Consequently, the vendor of the image supply device can construct the first entity without awareness of the type of a communication channel adopted by each vendor of the image output device. Identical control information can be exchanged between the image supply device and the respective image output devices by combination of the thus constructed first entity with the second entity corresponding to the selected communication channel. Similarly, even a vendor of the image output device can exchange single control information between the image output device and the respective image supply devices by combination of the thus-constructed first entity with the second entity corresponding to the selected communication channel. Therefore, control information compatibility pertaining to image output among a plurality of vendors is ensured.

Further, in the image output system, the control information pertaining to image output is described in a markup language. Therefore, the control information is on a text basis and easy to read, and addition and correction of the control information after prescription is easy. Moreover, when control information pertaining to image output is desired to be subjected to addition or amendment after prescription, the only requirement is to correct the first entity, whereby the amount of correction required at the time of addition and modification is made smaller.

Moreover, according to the first embodiment, a PTP is used as an image data file management protocol. As a result, various existing protocols can be used at the second and third entities corresponding to the protocols located at a level lower than the image data file management protocol. An image output system which communicates control information pertaining to image output can be formed within a short time period. Further, the protocol becomes easily subjected to addition or correction after prescription. The same advantage can be expected to be yielded even when a USB mass storage class is used as the image data file management protocol in place of the PTP.

According to the first embodiment, the third entity controls the USB. The third entity also uses a still image class as the class of the USB. As a result, an existing entity can be utilized for at least the third entity. An image output system which exchanges control information pertaining to image output can be formed within a short time period. Further, addition or correction of the protocol after prescription becomes easy.

According to the first embodiment, the communication controllers 12, 22 convert the image output control protocol of the first entity into the image data file management protocol of the same or vice versa at the wrapper layer, according to the type of the image data file management protocol of the second entity (the PTP in the embodiment). As a result, the wrapper layer absorbs a difference between the adopted image data file management protocols, as required. Therefore, the image output control protocol of the first entity is not corrected essentially even when the image data file management protocol of the second entity is changed to another protocol or corrected. Accordingly, addition or correction of the protocol after prescription becomes easy. Moreover, an image output system for communicating control information pertaining to image output can be formed within a short time period.

According to the first embodiment, the output controller 13 of the image output device 1 controls a processing flow of image output. As a result, the quantity of information processing to be performed by the image supply device 2 essentially does not increase. The system can be implemented even when the image supply device 2 has a low level of information processing performance.

According to the first embodiment, the communication controllers 12, 22 communicate, as control information pertaining to image output and in the form of a series of scripts described in a markup language, a control command for image output processing, a response to the control command, and notification of a status of the device (including a job status). As a result, a control command which is on a text basis and easy to read, a response to the control command, and notification of status of the device can be communicated, and the protocol can be made easy to correct after prescription while compatibility between a plurality of vendors is maintained.

In the first embodiment, each of the communication controllers 12, 22 has one second entity and one third entity. As illustrated in a case shown in FIG. 11 where three entities are provided, each of the communication controllers 12, 22 may have a plurality of sets, each consisting of a second entity and a corresponding third entity.

Figure 11:
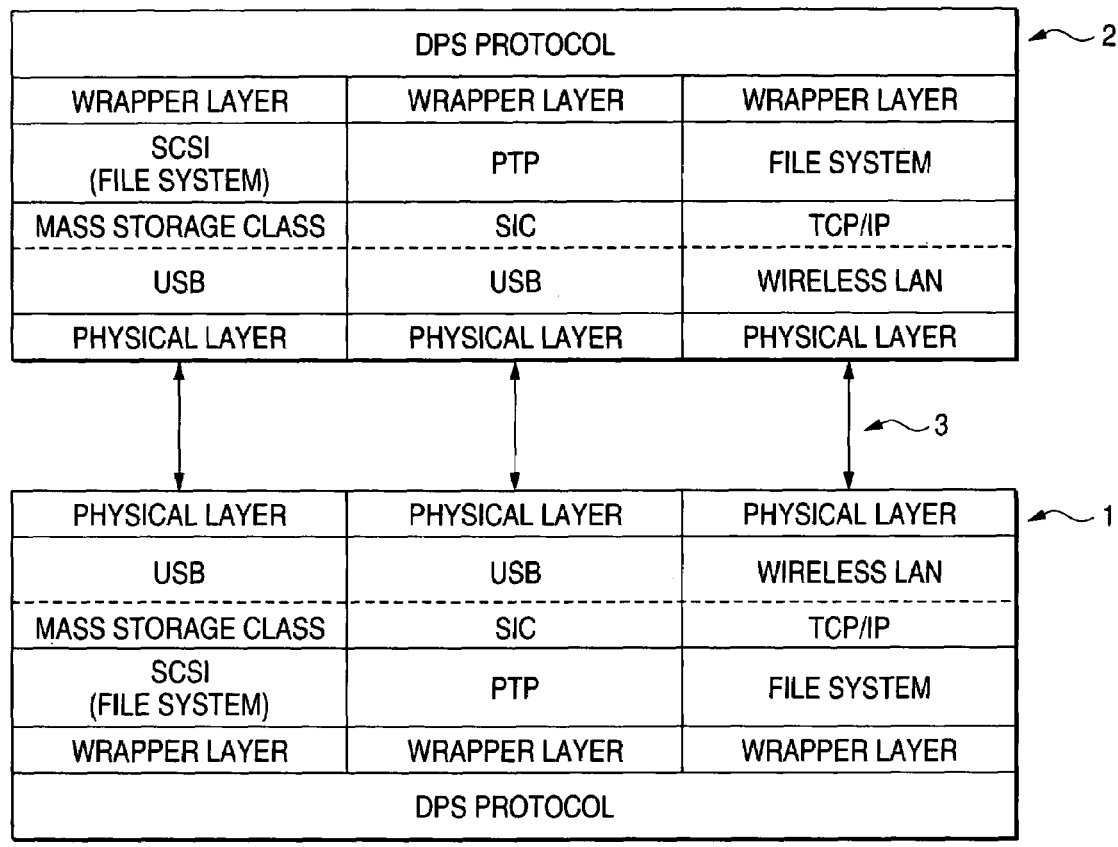
FIG. 11 is a view showing another example of the protocol used between the image output device and the image supply device in the image output system of the first embodiment.

The image output system shown in FIG. 11 has, as layers located at levels lower than the first entity, a second entity for interpreting a PTP and a third entity for controlling a physical layer at the still image class of the USB; a second entity for implementing a file system using an SCSI and a third entity for controlling a physical layer at a USB mass storage class; a second entity for implementing a file system; and a third entity for controlling a physical layer at a TCP/IP and a wireless LAN protocol. As a result, the image output system enables exchange of identical control information through use of any one of combinations of the plurality of image data file management protocols and a communication channel.

The image output system shown in FIG. 11 has a wrapper layer between the first entity and the respective second entities. The wrapper layer translates control information between the image output control protocol of the first entity and the respective image data file management protocols of the same, according to the type of the image data file management protocol of the second entity. Further, the image output device 1 and the image supply device 2 of the image output system have a selector for selecting a combination for use in exchanging the control information, from among a plurality of combinations of the second and third entities. The selector is implemented by the communication controllers 12, 22, or the output controller 13 and the central controller 23.

As a result, the wrapper layer (protocol converter) can absorb a difference between image data file management protocols utilized by the second entity. Therefore, the image output control protocol of the first entity is not subjected to any substantial correction even when the image data file management protocol of the first entity is changed or corrected to another protocol. Accordingly, the protocol becomes easily subjected to addition or amendment after prescription. Further, an image output system for communicating control information pertaining to an image output can be formed within a short time period. Moreover, as a result of the selector making a switch between the second and third entities, control information pertaining to an image output can be continuously communicated by utilization of a combination of the second and third entities that differs from that utilized thus far.

Figure 12:
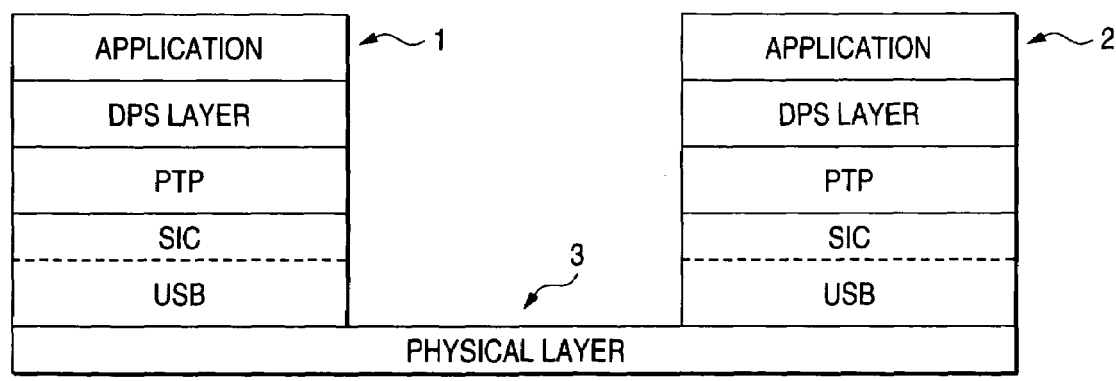
FIG. 12 is a view showing another example of the protocol used between the image output device and the image supply device in the image output system of the first embodiment.

In relation to the protocol hierarchy shown in FIGS. 2 and 11, a wrapper layer is provided between the DPS protocol layer and the low-level protocol layer in order to cope with variations in the low-level protocol layer. However, as shown in FIG. 12, a function equivalent to that of the wrapper layer is imparted to the lowest layer of the DPS protocol layer, and a layer for managing a control flow of print processing of the DPS protocol may be provided as an application layer, such as another program (i.e., an entity).

In an image output system according to a second embodiment of the invention, the image supply device 2 stores image data and a job specification file for specifying an image output job. The image output device 1 acquires the job specification file, and on the basis of the information about the job specification file, generates control information pertaining to an image output described in a markup language.

In the second embodiment the image data and the job specification file are stored in the storage medium 24 by the DPOF (Digital Print Order Format). The current version of DPOF is version 1.10. However, the next version and subsequent versions, which will be proposed in future, may also be adopted. Alternatively, another standard which will yield the same working effect may also be used in place of the DPOF.

FIG. 13 is a view for describing a directory structure of the DPOF standard. According to a directory structure of the DPOM standard, low-level directories located at the root level include a directory DCIM located at a level higher than the image data file, and a directory MISC located at a level higher than the job specification file. A directory unique to a vendor (e.g., 100EPSON in the embodiment) is provided at a level lower than the directory DCIM. An image data file (e.g., IMAGE 01.JPEG) is provided in the directory The directory MISC includes AUTPRINT.MRK, which is a print job specification file. The job specification file AUTPRINT.MRK of DPOF standard includes print job information, image source information, and print setting information.

FIG. 14 is a view showing an example job specification file AUTPRINT.MRK of the DPOF standard. The AUTPRINT.MRK shown in FIG. 14 includes three jobs. A job ID (PRT PID), a print type (PRT TYP), the number of copies (PRT QTY), the location where image data are stored (IMG SRC), and image data format (IMG FMT) are specified for each of the jobs.

The image output device 1 and the image supply device 2, both belonging to the second embodiment, are basically identical with those described in connection with the first embodiment. However, as will be described below, the communication controller 12 and the communication controller 22, both belonging to the second embodiment, are changed.

Figure 15:
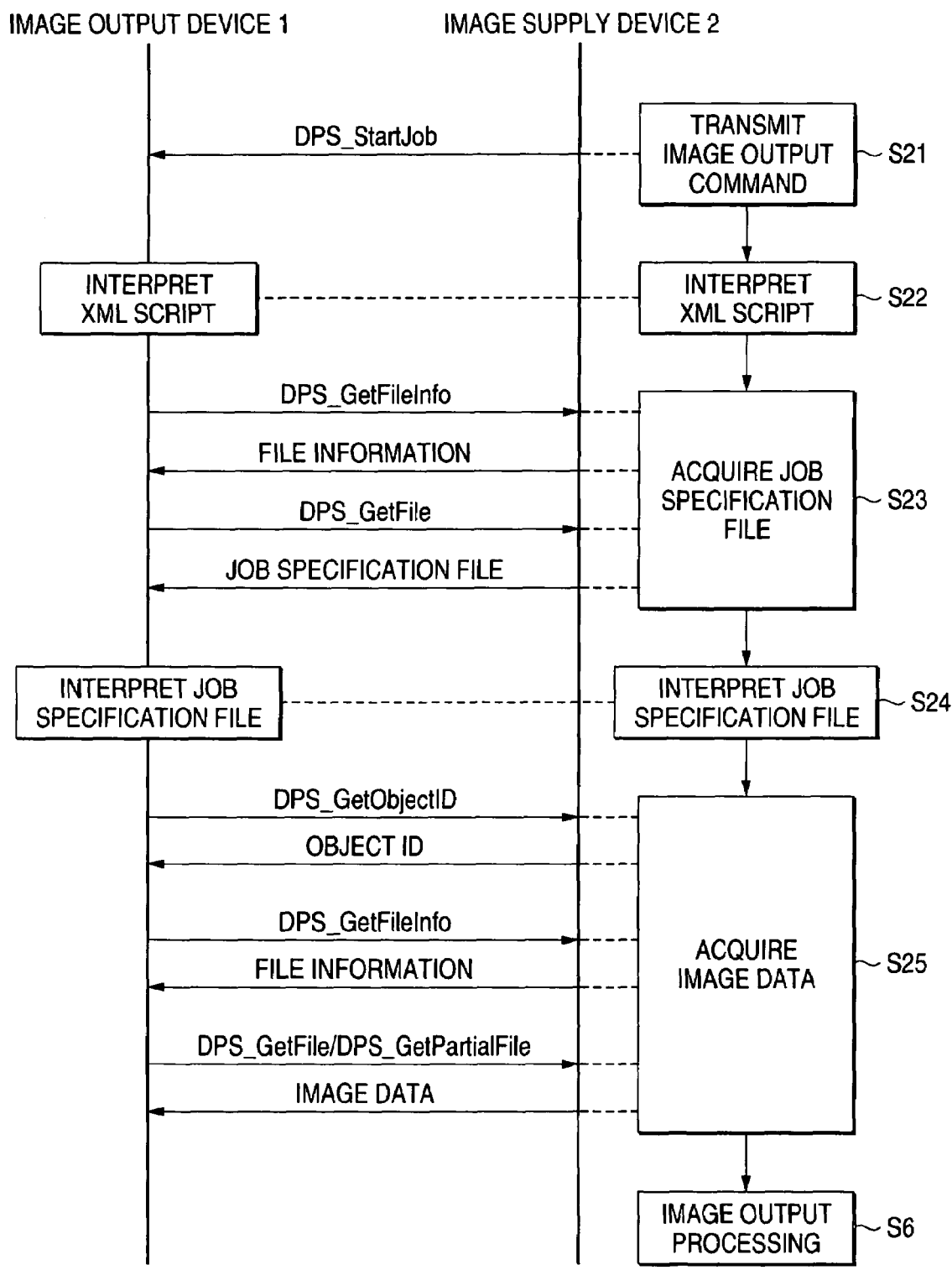
FIG. 15 is a view for describing image output processing on the DPS protocol level in an image output system of a second embodiment.
Figure 16:
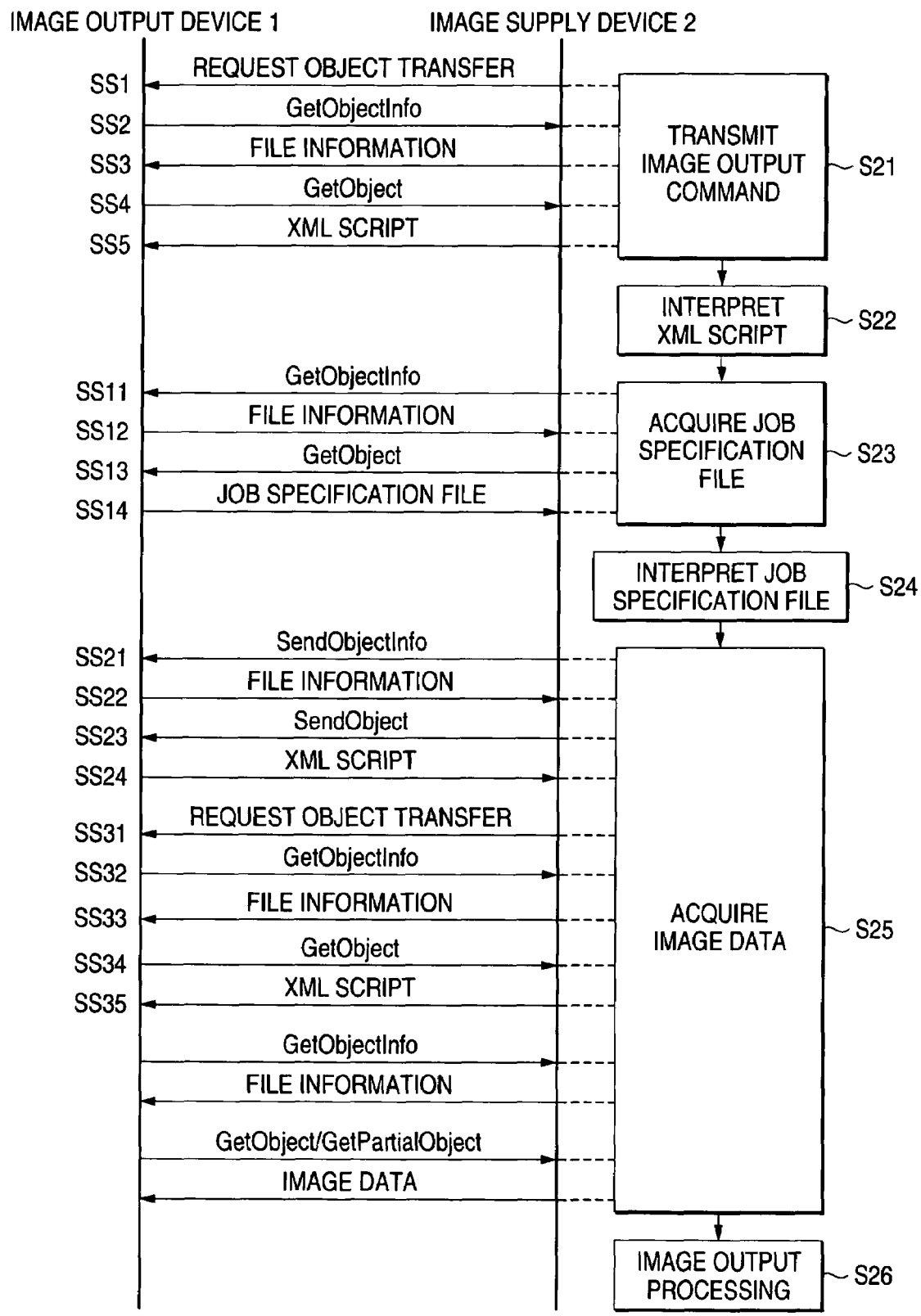
FIG. 16 is a view for describing image output processing on the image transfer protocol level in the image output system of the second embodiment.

Operations of individual devices of the system will now be described. FIG. 15 is a view for describing image output processing at the DPS protocol level in the image output system of the second embodiment. FIG. 16 is a view for describing image output processing at the image transfer protocol level in the image output system of the second embodiment.

When a predetermined operation is performed by way of, e.g., the control panel 25, the image supply device 2 transmits the image output job start command to the image output device 1 by way of the communication channel 3 (step S21).

At that time, the communication controller 22 in the image supply device 2 generates and transmits an XML script of an image output job start command "DPS_StartJob". Here, use of the job specification file is described in the XML script. Specifically, in the script, such as that shown in FIG. 9, the job specification file is specified by an image ID tag for specifying image data. An object ID of the job specification file is used for the specifying operation.

Communication processing to be performed when the XML script of the image output job start command "DPS_StartJob" is transmitted from the image supply device 2 to the image output device 1 is identical with that pertaining to step S1 in the first embodiment, and hence its explanation is omitted.

Next, the image output device 1 interprets the thus-acquired XML script (step S22), and the job specification file described in the XML script is acquired by way of the image supply device 2 (step S23).

At that time, in the image output device 1, the communication controller 12 specifies the job specification file in accordance with the DPS protocol through use of an object ID (corresponding to an object ID in the PTP) described in the XML script, thereby transmitting the file information acquisition command "DPS_GetFileInfo" of the XML script. The communication controller 12 converts the file information acquisition command "DPS_GetFileInfo" of the DPS protocol into the file information acquisition command "GetObjectInfo" of the image transfer protocol and transmits the thus-converted command (step SS11). This command is transmitted to the image supply device 2 by way of the USS layer and the physical layer.

In the image supply device 2, upon receipt of the command "GetObjectInfo" in accordance with the image transfer protocol, the communication controller 22 transmits file information about the file of the specified object ID (step SS12). The file information is transmitted to the image output device 1 by way of the USB layer and the physical layer.

In the image output device 1, upon receipt of the file information in accordance with the image transfer protocol, the communication controller 12 describes the file information as an XML script and passes the script to the DPS protocol layer.

Next, in the image output device 1, the communication controller 12 issues a file acquisition command "DPS_GetFile" of an XML script in accordance with the DPS protocol by designating the job specification file through use of an object ID. The communication controller 12 converts the file acquisition command "DPS_GetFile" of the DPS protocol into the file acquisition command "GetObject" of the image transfer protocol and transmits the thus-converted command (step SS13) This command is transmitted to the image supply device 2 by way of the USB layer and the physical layer.

In the image supply device 2, upon receipt of the command "GetObject" in accordance with the image transfer protocol, the communication controller 22 reads and transmits the file of the specified object ID (i.e., the job specification file) (step SS14). The file is transmitted to the image output device 1 by way of the USB layer and the physical layer.

In the image output device 1, the communication controller 12 has received the file in accordance with the image transfer protocol, whereupon the file is also considered to have been received on the DPS protocol layer.

Here, if the image output device 1 corresponds to the printer shown in FIGS. 3 and 4, and the image supply device 2 corresponds to the digital camera shown in FIGS. 5 and 6, the DPS protocol processing function 52 and the communication control function 51, both belonging to the image output device 1, and the communication control function 81 and the file system management function 83, both belonging to the image supply device 2, are used for acquiring the job specification file.

Upon acquisition of the job specification file, the communication controller 12 of the image output device 1 interprets the job specification file (step S24).

The communication controller 12 of the image output device 1 acquires from the image supply device 2 image data specified by way of the jobs described in the job specification file (step S25).

At that time, the location where the image data file is stored is described in the job specification file AUTPRINT.MRK of the DPOF standard by the relative path. Hence, in order to acquire the object ID of the image data, the communication controller 12 in the image output device 1 generates and transmits the command "DPS_GetObjectID", which is to be used for specifying a path and acquiring an object ID for a file of that path, according to the DPS protocol.

FIG. 17 is a view showing an example XML script of the object ID acquisition command "DPS_GetObjectID" employed in the second embodiment. A getObjectIDRequest tag is a fag showing an object ID acquisition command. A basePathID tag and an imagePath tag are arranged at levels lower than the getObjectIDRequest tag. The basePathID tag is for specifying a directory which is a basis of a relative path to be specified by the imagePath tag. The imagePath tag is for specifying a file for which an object file is to be acquired, from the directory specified by the basePathID tag through use of the relative path.

When the command "DPS_GetObjectID" has been issued on the DPS protocol layer, the communication controller 12 of the image output device 1 transmits the command "SendObjectInfo", the command "SendObject", the XML script and file information pertaining to the XML script in accordance with the image transfer protocol (steps SS21 to SS24). These commands, the file information, and the XML scripts are transmitted to the image supply device 2 by way of the USB layer and the physical layer.

In the image supply device 2, the communication controller 22 receives the commands, the file information, and the XML scripts in accordance with the image transfer protocol and receives the command "DPS_GetObjectID", which is an XML script, in accordance with the DPS protocol.

In accordance with the DPS protocol, the communication controller 22 of the image supply device 2 interprets the XML script of the received command "DPS_GetObjectID", specifies the object ID allocated to a file of the path specified by the command "DPS_GetObjectID", and generates and transmits the XML script showing the object ID as a response to the command "DPS_GetObjectID".

FIG. 18 is a view showing an example XML script of a response to the object ID acquisition command "DPS_GetObjectID" used in the second embodiment. An opResult tag is for specifying a processing result code of an object ID acquisition command. Further, a getObjectIDResponse tag is for specifying a return value of the result of processing of the object ID acquisition command. A basePathID tag, an imagePath tag, and an imageID tag are provided at levels lower than the getObjectIDResponse tag. The basePathID tag and the imagePath tag are identical with those specified in the command. The image ID tag is for specifying an object ID acquired as a result of processing of the command.

Upon receipt of the response to the command "DPS_GetObjectID" on the DPS protocol layer in accordance with the image transfer protocol, the communication controller 22 of the image supply device 2 first transmits a file transfer request command "RequestObjectTransfer" (step SS31). This command is transmitted to the image output device 1 by way of the USB layer and the physical layer.

In the image output device 1, upon receipt of the file transfer request command "RequestObjectTransfer" in accordance with the image transfer protocol, the communication controller 12 transmits a command "GetObjectInfo" for inquiring an attribute of the file to be transferred (step SS32). This command is transmitted to the image supply device 2 by way of the USB layer and the physical layer.

In the image supply device 2, upon receipt of the command "GetObjectInfo" in accordance with the image transfer protocol, the communication controller 22 transmits the file information pertaining to an XML script of the response to the command "DPS_GetObjectID" (step SS33). The file information is transmitted to the image output device 1 by way of the USB layer and the physical layer.

In the image output device 1, upon receipt of the file information in accordance with the image transfer protocol, the communication controller 12 transmits the file acquisition command "GetObject" by specifying an XML script of the response (step SS34). The file information is transmitted to the image supply device 2 by way of the USB layer and the physical layer.

In the image supply device 2, upon receipt of the command "GetObject" in accordance with the image transfer protocol, the communication controller 22 transmits the thus-specified file (an XML script of the response to the command "DPS_GetObjectID") (step SS35). The file is then transmitted to the image output device 1 by way of the USB layer and the physical layer.

In the image output device 1, upon receipt of the file in accordance with the image transfer protocol, the communication controller 12 is considered to have received the response corresponding to the command "DPS_GetObjectID" on the DPS protocol layer.

In this way, the image output device 1 acquires the object ID of the image data file specified by the job specification file.

In the image output device 1, the communication controller 12 specifies the image data file by the object ID acquired in accordance with the DPS protocol, thereby transmitting the file information acquisition command "DPS_GetFileInfo" of the XML script.

FIG. 19 is a view showing an example XML script of the file information acquisition command "DPS_GetFileInfo" used in the second embodiment. A getFileInfoRequest tag is for specifying a file information acquisition command. A fileId tag is located at a level lower than the getFileInfoRequest tag. A fileId tag is for specifying an object ID of the file which is an object of file information acquisition.

The communication controller 12 of the image output device 1 converts the file information acquisition command "DPS_GetFileInfo" of the DPS protocol into the file information acquisition command "GetObjectInfo" of the image transfer protocol and transmits the thus-converted command. The command is transmitted to the image supply device 2 by way of the USB layer and the physical layer.

In the image supply device 2, upon receipt of the command "GetObjectInfo" in accordance with the image transfer protocol, the communication controller 22 transmits the file information about the file of the specified object ID. The file information is transmitted to the image output device 1 by way of the USB layer and the physical layer.

In the image output device 1, upon receipt of the file information in accordance with the image transfer protocol, the communication controller 12 describes the file information as an XML script and passes the script to the DPS protocol layer.

FIG. 20 is a view showing an example XML script of the response to the file information acquisition command "DPS_GetFileInfo" used in the second embodiment. An opResult tag is for specifying a processing result code of the object ID acquisition command. A getFileInfoResponse tag is for specifying a return value of the processing result of the file information acquisition command. A fileType tag and a fileSize tag are provided at levels lower than the getFileInfoResponse tag. The fileType tag is for specifying a file format of the file information. A fileSize tag is for specifying a file size of the file information. The file format is specified by any of numbers previously allocated to respective formats.

Next, in the image output device 1, the communication controller 12 transmits a file acquisition command "DPS_GetFile" of the XML script in accordance with the DPS protocol by specifying an image data file through use of the acquired object ID. The communication controller 12 converts the file acquisition command "DPS_GetFile" of the DPS protocol into a file acquisition command "GetObject" of the image transfer protocol and transmits the thus-converted command. The command is transmitted to the image supply device 2 by way of the USB layer and the physical layer.

In place of the file acquisition command "DPS_GetFile" for acquiring an entire file, an entire file may be acquired by transmitting a plurality of times the partial file acquisition command "DPS_GetPartialFile" for acquiring a part of the file. The partial file acquisition command "DPS_GetPartialFile" is converted into the command "GetPartialObject" of the image transfer protocol.

In the image supply device 2, upon receipt of the command "GetObject" in accordance with the image transfer protocol, the communication controller 22 reads and transmits a file of the specified object ID (i.e., an image data file 31). This file is transmitted to the image output device 1 by way of the USB layer and the physical layer.

In the image output device 1, upon receipt of the file in accordance with the image transfer protocol, the communication controller 12 is considered to have received the file even on the DPS protocol layer.

Here, if the image output device 1 corresponds to the printer shown in FIGS. 3 and 4, and the image supply device 2 corresponds to the digital camera shown in FIGS. 5 and 6, the DPS protocol processing function 52 and the communication control function 51, both belonging to the image output device 1, and the communication control function 81 and the file system management function 83, both belonging to the image supply device 2, are used for acquiring the image data.

Upon acquisition of the image data, the image output device 1 outputs an image based on the image data (step S26). At that time, in the image output device 1, the output controller 13 and the output mechanism 14 perform image output processing.

Here, in a case where the image output device 1 corresponds to the printer shown in FIGS. 3 and 4, the image processing function 53, the print data generating function 54, and the print control function 55 are used for image output processing.

In this way, according to the second embodiment, the job specification file stored in the image supply device 2 is transferred to the image output device 1, and the image output device 1 interprets the job specification file, thereby executing a job. However, there may be configured the image supply device 2 interprets the job specification file, generates a job start command in accordance with contents of the job specification file, and transmits the command to the image output device 1. In this case, the image output device 1 may be arranged to interpret the job start command and execute the job.

The image output system of the second embodiment can be embodied by combination with any of the other embodiments.

As mentioned above, according to the second embodiment, the image supply device 2 stores image data and a job specification file for specifying an image output job (e.g., an AUTPRINT.MRK file of the DPOF in the embodiment). The image output device 1 acquires the job specification file, interprets the thus-specified job, and on the basis of information about the job specification file generates control information pertaining to an image output described in a markup language. As a result, an existing job specification file of the DPOF standard can be used, and a complicated image output job can be executed readily.

According to the second embodiment, the image supply device 2 enables specification of either the job specification file, or one or more image data sets which are objects of image output, through use of the image output job start command. When the image data are specified by the image output job start command, the image output device 1 acquires the image data from the image supply device 2 in accordance with the image output job start command. When the job specification file is specified by the image output job start command, the job specification file is acquired from the image supply device 2 in accordance with the image output job start command. The image data specified by the job specification file are acquired from the image supply device 2. As a result, the image data which are to be an object of image output can be specified on a per-image-data basis or while being merged by the job specification file. Image output jobs of various patterns can be effected.

An image output system according to a third embodiment of the invention is arranged to perform recovery processing when the image output system of the first or second embodiment has recovered from a self-unrecoverable failure (e.g., paper jam, power disconnection, or disconnection of a communication channel).

In the image output system of the third embodiment, the image output device 1 transmits, to the image supply device 2, resumption information for a print object allocated to a predetermined position (e.g., a top, a bottom, or the like) within a page layout during print processing serving as image output After print processing has been aborted by a failure, control information for specifying the first print object after resumption is received from the image supply device 2 along with a print job start command for newly starting print processing. Print processing is resumed from that print object. Meanwhile, the image supply device 2 receives and stores the resumption information. When print processing is resumed, the control information for specifying a first print object after resumption is transmitted to the image output device 1 on the basis of the finally-stored resumption information along with the print job start command for newly starting print processing.

The image output device 1 and the image supply device 2, both belonging to the third embodiment, are analogous to those of the first embodiment in terms of basic configuration, and the following functions are added.

Operations of the respective devices in the system will now be described.

Figure 21:
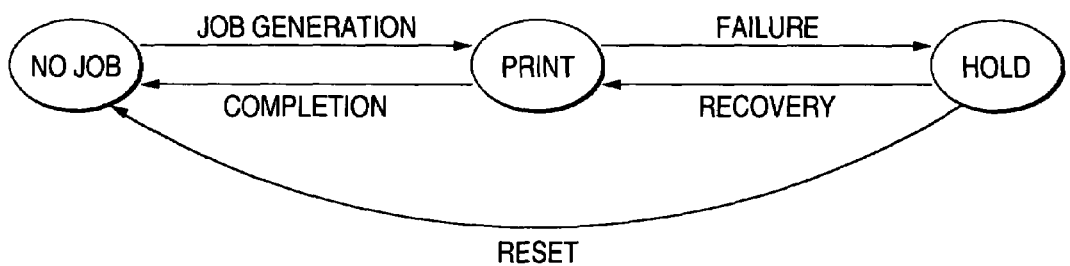
FIG. 21 is a status transition view pertaining to an image output device in an image output system of a third embodiment.

FIG. 21 is a status transition view of an image output device in the image output system of the third embodiment.

When no print job is present, the image output device 1 is in a no-job status (i.e., an idle state). When a print job is supplied from the image supply device 2, the image output device 1 shifts to a printing state, where print processing is performed. When the print job is completed and is not followed by any other print job, the image output device 1 shifts to the no-job state. This status is managed by the output controller 13 of the image output device 1.

When a failure has arisen in the printing state, the image output device 1 shifts to a hold state, where print processing is interrupted. When the failure is self-recoverable, the image output device 1 returns to the printing state after the failure has been eliminated, thereby resuming the interrupted print processing. Meanwhile, when the failure is self-unrecoverable, such as a paper jam or disconnection of a communication channel, the image output device 1 remains in the hold state until a reset command is received. When the reset command is received, the image output device 1 discards the interrupted print job and shifts to the no-job state. When the remainder of the print job is still present or a new print job has arisen afterwards, the image output device 1 shifts to the printing state.

If the power of the image output device 1 is disconnected, the print job of the image output device 1 will disappear. When power is turned on, the image output device 1 enters the no-job state.

Next will be described recovery processing. As will be described below, recovery processing procedures can be set to any of a plurality of types of procedures in accordance with the type of a failure.

Figure 22:
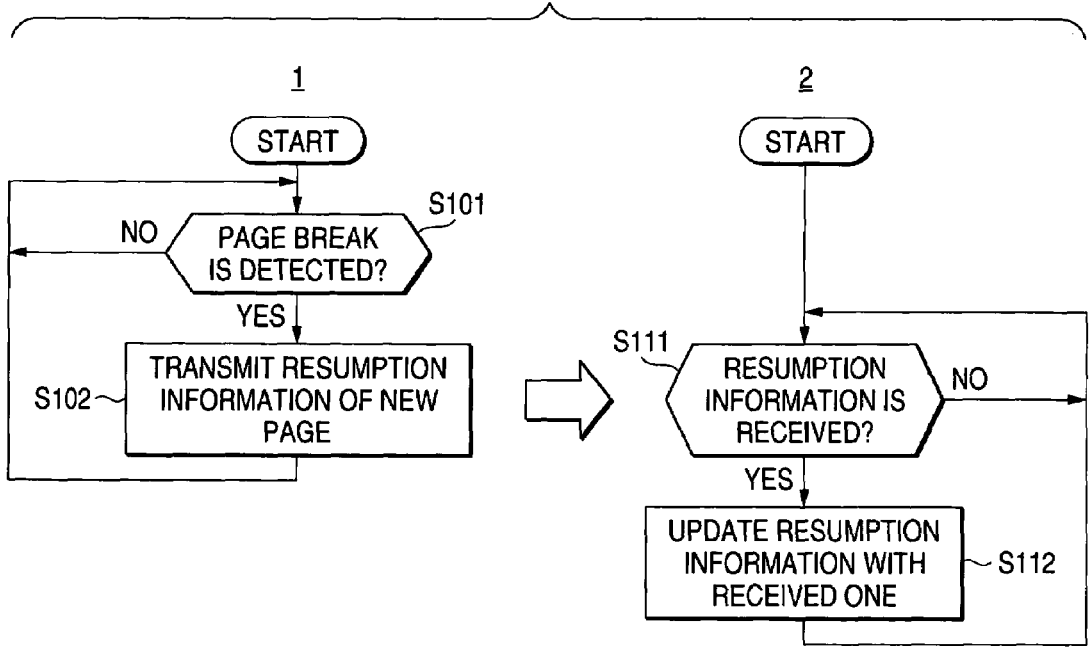
FIG. 22 is a flowchart for describing recovery processing performed during normal printing operation of the image output system of the third embodiment.
Figure 23:
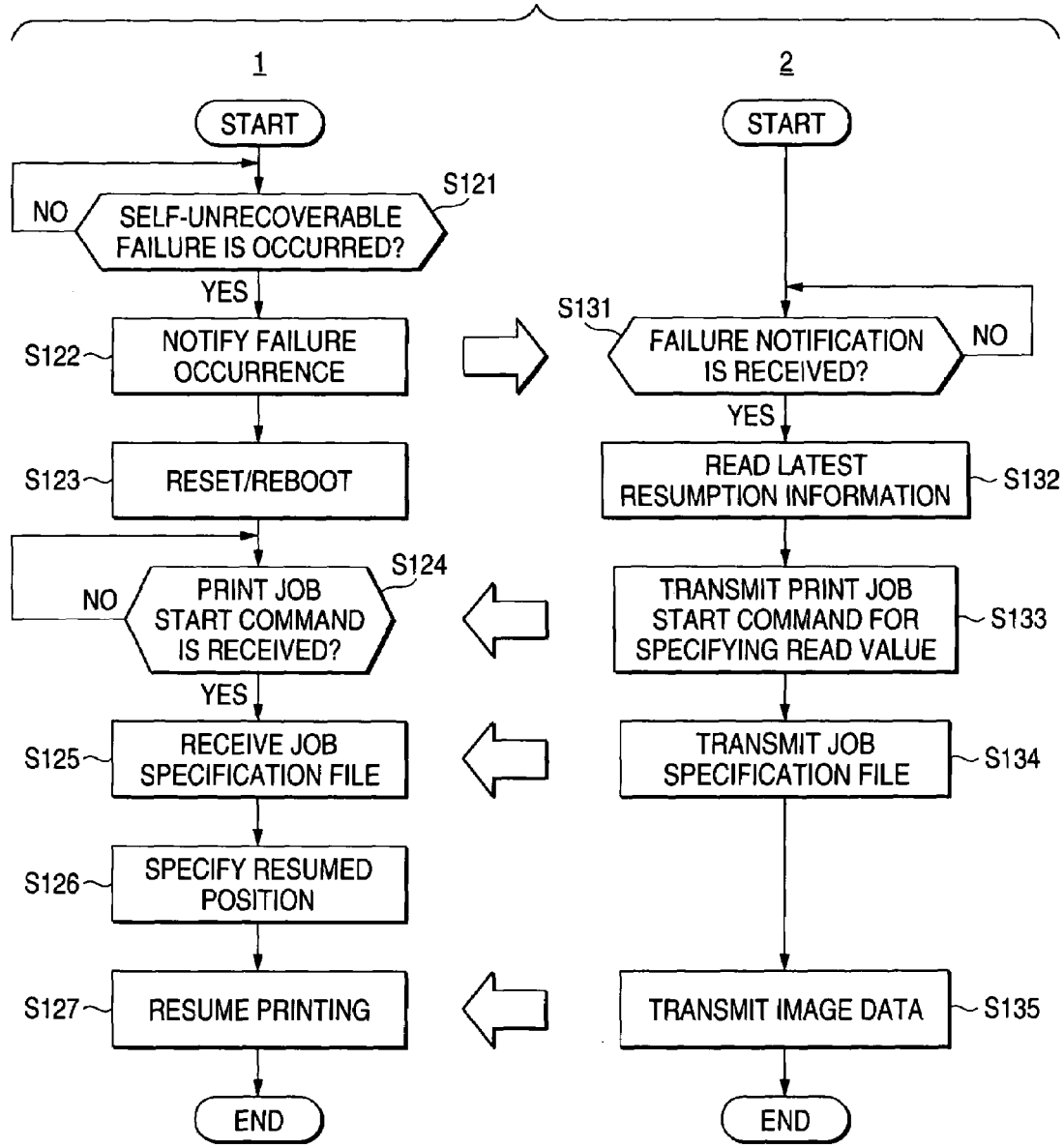
FIG. 23 is a flowchart for describing recovery processing of the image output system of the third embodiment.

First, there will be described example recovery processing required to be performed in the event of occurrence of a self-unrecoverable failure, such as a paper jam, disconnection of a communication channel, normal disconnection of power, or anomalous disconnection of power. FIG. 22 is a flowchart for describing processing to be performed during normal print processing of the image output system of the third embodiment FIG. 23 is a flowchart for describing example recovery processing of the image output system of the third embodiment.

In the printing state, the image output device 1 performs print processing. When a page break is detected (step S101), job status information at the top of the new page is transmitted to the image supply device 2. Specifically, the image output device 1 transmits, to the image supply device 2 as resumption information (i.e., job status information used for recovery processing), a job ID (corresponding to a value of "PRT PID" of DPOF) of the print job that specifies the image data first appearing in a page layout of the page of interest (new page); a path of a location where the image data are stored (corresponding to a value of "IMG SRC" of DPOF); and the number of repeated supply operations (corresponding to a value of "PRT QTY" of DPOF) (step S102).

In the third embodiment, when a page change has been performed, the communication controller 12 of the image output device 1 generates an XML script of a job status notification command "DPS_NotifyJobStatus" for notification of job status information at that time point, in accordance with a DPS protocol and transmits the script. In the XML script of the command "DPS_NotifyJobStatus", the value of the job ID is surrounded by a tag <prtPid>,</prtPid> showing the job ID; the value of the path of the location where the image data are stored is surrounded by a tag <imagePath>, </imagePath> showing a path of the location where the image data are stored; and the value of the number of repeated supply operations is surrounded by a tag <copyId>, </copyId> showing the number of repeated supply operations.

FIG. 24 is a view showing an example XML script of the job status notification command "DPS_NotifyJobStatus" used in the third embodiment. A notifyJobStatusRequest tag is for showing a job status notification command. A jStatus tag, a prtPid tag, an imagePath tag, a copyId tag, a progress tag, and a jEndReason tag are arranged at levels lower than the notifyJobStatusRequest tag.

When the job specification file is used, the value of the job specification file AUTPRINT.MRK of the DPOF acquired by the image output device 1 is used for the value specified by the prtPid tag, the value specified by the image Path tag, and the value specified by the copyId tag, whereby a job ID for the job that is being processed at that time, a path of image data, and the number of repeated supply operations are set.

The jStatus tag is for specifying that the job is in the printing state, the no-job state, or the hold state. The progress tag is for specifying, in an N/T format, the total number of pages T in a job and a page number N that is now being printed. The jEndReason tag is for specifying a value showing a cause of termination of a job, such as a normal end, termination made by the user, or an abnormal end. When the image output device 1 is in the no-job state, a value is specified by the jEndReason tag.

In the script shown in FIG. 24, the job ID, the image path, and the number of repeated supply operations are specified by the prtPid tag, the image Path tag, and the copyId tag. When the job specification file is not used, the image data specified by the imageID tag in the job start command and the number of repeated supply operations specified by the copies tag may be used in the job status notification command instead.

Upon receipt of resumption information, such as the job ID, a path of the location where image data first appearing in a page of interest is stored, and the number of times image data are to be repetitively supplied, from the image output device 1 at every a page change (step S111), the image supply device 2 updates the resumption information with that received from the image output device 1 (step S112).

In the third embodiment, the communication controller 22 of the image supply device 2 receives the XML script that is the command "DPS_NotifyJobStatus" for each page, in accordance with the DPS protocol. A job ID, a path of a location where image data are stored, and the number of times image data are to be repetitively supplied are extracted from the XML script, and the thus-extracted information is stored.

Thus, the image supply device 2 sequentially stores resumption information, such as a job ID of a print job which specifies image data at a predetermined location (in the embodiment, the top of the page), a path of a location where the image data are stored, and the number of times the image data are to be repetitively supplied, for each page for which print processing has been started. Only the updated job ID, the path of the location where the image data are stored, and the number of times the image data are to be repetitively supplied are required, and hence outdated information may be deleted.

When a self-unrecoverable failure, such a paper jam or an operation for disconnecting power, has arisen in the printing state (step S121), the image output device 1 shifts to a hold state and reports occurrence of a failure to the image supply device 2 (step S122). When power is normally disconnected by deactivation operation, the image output device 1 reports disconnection by use of a battery or the power of a capacitor.

In the third embodiment, in the event of occurrence of a failure, the communication controller 12 of the image output device 1 generates an XML script of a command "DPS_NotifyDeviceStatus" which reports the status of a device, in accordance with the DPS protocol and transmits the thus-generated command. In the XML script of the command "DPS_NotifyDeviceStatus", the value showing the failure state is surrounded by the tag <errorStatus>, </errorStatus>, and the value showing the cause of the failure is surrounded by a tag <reason>, </reason> showing the cause of the failure.

FIG. 25 is a view showing an example XML script of the device status notification command "DPS_NotifyDeviceStatus" used in the third embodiment. A notifyDeviceStatusRequest tag shows a device status notification command. An errorStatus tag, a reason tag, a disconnectEnable tag, and a capabilityChange tag are arranged at levels lower than the notifyDeviceStatusRequest tag.

The errorStatus tag is for specifying a failure status, such as no failure, a recoverable failure, or an unrecoverable failure. The reason tag is for specifying the cause of a failure, such as no failure, a paper-related failure, an ink-related failure, a hardware-related failure, and a data-related failure. The disconnectEnable tag is for specifying whether or not connection is released. The capabilityChange tag is for specifying whether or not a change has arisen in the print requirements allowed by the image output device 1.

Upon receipt from the image output device 1 of a notification relating to occurrence of a failure (step S131), the image supply device 2 reads the latest resumption information reported by the image output device 1 (e.g., a job ID, a path of a location where image data first appearing in a page of interest is stored, the number of times the image data is repetitively supplied, or the like) (step S132).

In the third embodiment, the communication controller 22 of the image supply device 2 receives the XML script of the command "DPS_NotifyDeviceStatus" in accordance with the DPS protocol and ascertains a failure status from the XML script.

The image supply device 2 adds the latest resumption information to the print job start command which has already been transmitted at the time of initiation of the print job and transmits the command (step S133).

In the third embodiment, the communication controller 22 of the image supply device 2 transmits the XML script of the command "DPS_StartJob" that has set the latest job ID, a path of a location where image data first appearing in a page of interest is stored, and the number of times the image data is repetitively supplied, in accordance with the DPS protocol.

FIG. 26 is a view showing an example XML script of the print job start command "DPS_StartJob" obtained at resumption of the job. In this embodiment, an object ID of the job specification file (e.g., 00000002 in the embodiment) is specified by the imageID tag A job ID showing the position for resumption, the path of the location where image data first appearing in a page of interest is stored, and the number of times the image data is repetitively supplied, are specified by the prtPid tag, the imagePath tag, and the copies tag.

Upon receipt of the print job start command (step S124), the image output device 1 transmits a request for transmission of the previously-used job specification file specified by the print job start command.

In the third embodiment, the communication controller 12 of the image output device 1 receives the job start command "DPS_StartJob" of an XML script in accordance with the DPS protocol and issues a file acquisition command "DPS_GetFile" by specifying a job specification file.

In accordance with the request for transmission of the job specification file, the image supply device 2 transmits the job specification file (step S134). The image output device 1 receive 5 the job specification file (step S125).

In the third embodiment, the communication controller 12 of the image output device 1 issues the file acquisition command "DPS_GetFile" in the DPS protocol, to thereby acquire the job specification file from the image supply device 2.

When, by reference to contents of the job specification file, the image output device 1 has found, within the job specification file, a position corresponding to the job ID specified by the print job start command, the path of the location where image data first appearing in a page of interest is stored, and the number of times the image data is repetitively supplied, the position is specified as a position where the print job is to be resumed (step S126).

The image output device 1 resumes the print job from that position for resumption (step S127) and acquires the image data from the image supply device 2, as required (steps S127, S135).

Figure 27:
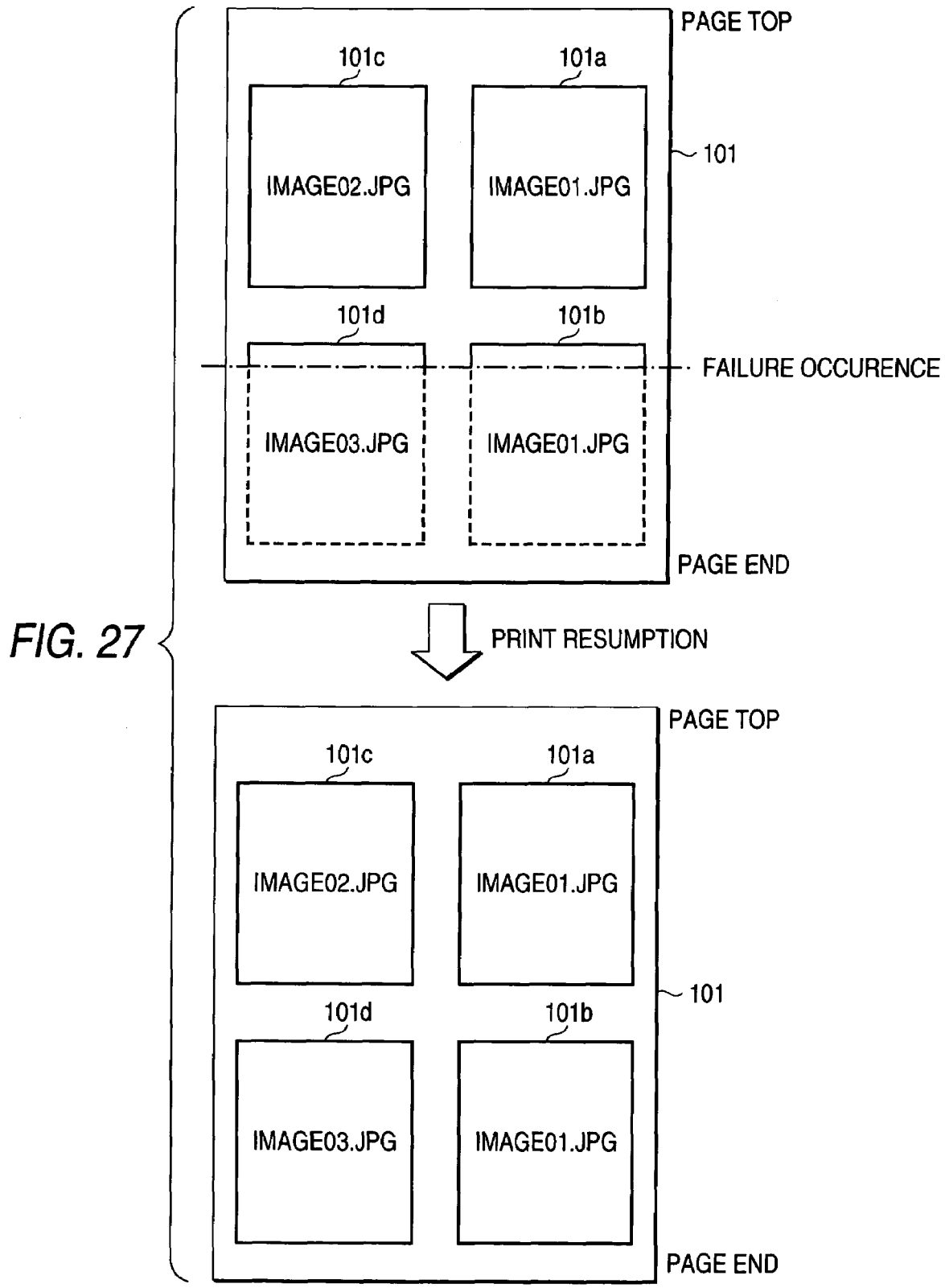
FIG. 27 is a view for describing resumption of printing operation in the image output system of the third embodiment.

As a result, the print job that has been interrupted as a result of occurrence of a failure is resumed after the reset command, and printing is resumed from the top of the page where the failure has arisen. FIG. 27 is a view for describing resumption of printing. For instance, even when a failure has arisen during the course of printing of images 101b, 101d after printing of images 101a, 101c, a position, where printing operation is to be resumed, in the job specification file is specified on the basis of the job ID, the path, and the repetitive number, all pertaining to the image 101a first appearing in the page of interest, whereupon the print job is resumed. As shown in FIG. 27, when a plurality of images are arranged within one page, a job ID for an image of the print job that appears first is stored, and printing is resumed from that image.

When a layout shown in FIG. 27 is made by the job specification file shown in FIG. 14, a job ID "001," a path "/DCIM/100EPSON/IMAGE01.JPG," and the number of repeated operations "002" are stored as resumption information pertaining to IMAGE01.JPG allocated to the image 101a. When a failure has arisen at the position shown in FIG. 27, printing is resumed with the same layout from the first job shown in FIG. 14.

When a page break has arisen during the course of repeated supply of an object of printing, the image output device 1 changes the value Of the number of repeated supply operations to be reported to the image supply device 2 to a remaining number of repeated supply operations and reports the changed value. As a result, when a page break has arisen during the course of repeated supply of an object of printing, the image supply device 2 changes the number of repeated supply operations to be stored to a remaining number of repeated supply operations. In this case, a position where the job is to be resumed is arranged so as to be detected by the job ID and the file path, or a corresponding number of repeated supply operations within the job specification file to be transmitted to the image output device 1 is changed similarly.

Figure 28:
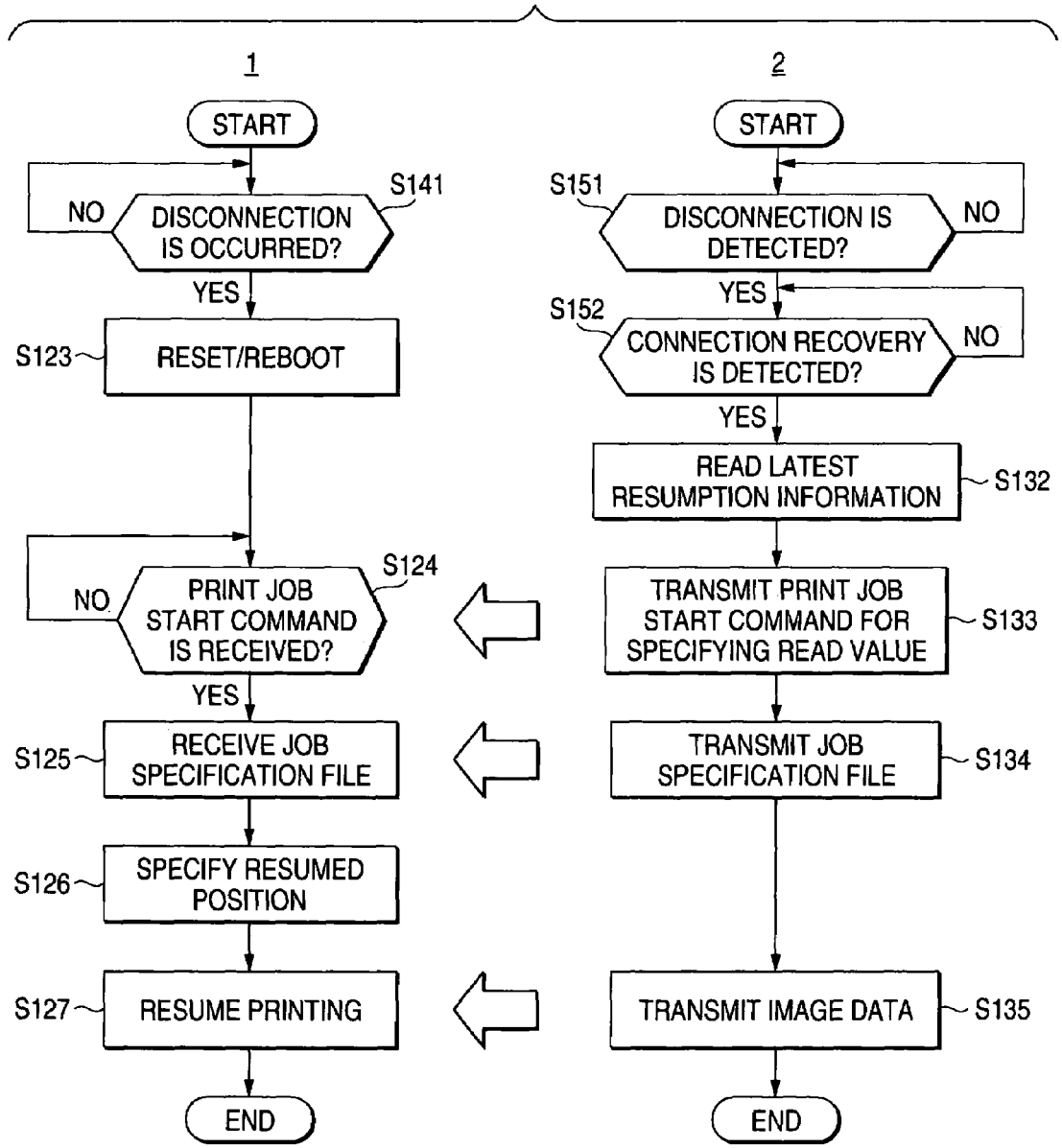
FIG. 28 is a flowchart for describing another example of recovery processing of the image output system according to the third embodiment of the invention.

Next, there will be described example recovery processing to be performed when disconnection of the communication channel 3 and abnormal disconnection of power to the image output device 1 have arisen, with reference to FIG. 28. In this case, processing to be performed during normal operation is identical with that in the previously-described case (see FIG. 22).

First, in the event that disconnection of the communication channel 3 or abnormal disconnection of power to the image output device 1 has arisen (step S141), communication between the image output device 1 and the image supply device 2 is disconnected, and hence the image supply device 2 eventually detects disconnection of communication (e.g., connection of a USB) (step S151).

When the communication channel 3 or power has recovered, the image output device 1 performs resetting or rebooting operation (step S123). When communication is established by way of the communication channel 3, the image supply device 2 detects recovery of the communication with the image output device 1 (step 8152).

When the connection has recovered, as mentioned previously, the image supply device 2 transmits resumption information to the image output device 1 along with the print job start command. The image output device 1 resumes the print job accordingly.

In the case of the above-described example recovery processing, the image output device 1 transmits resumption information to the image supply device 2 on a per-page basis. When having detected occurrence of a failure such as a paper jam, the image output device 1 may instead automatically transmit resumption information to the image supply device 2. This case will now be described with reference to FIG. 29.

In this case, the processing to be performed during normal operation, such as that described in connection with the above case, is not particularly required. In the event of occurrence of a failure, resumption information is transmitted from the image output device 1 to the image supply device 2.

Figure 29:
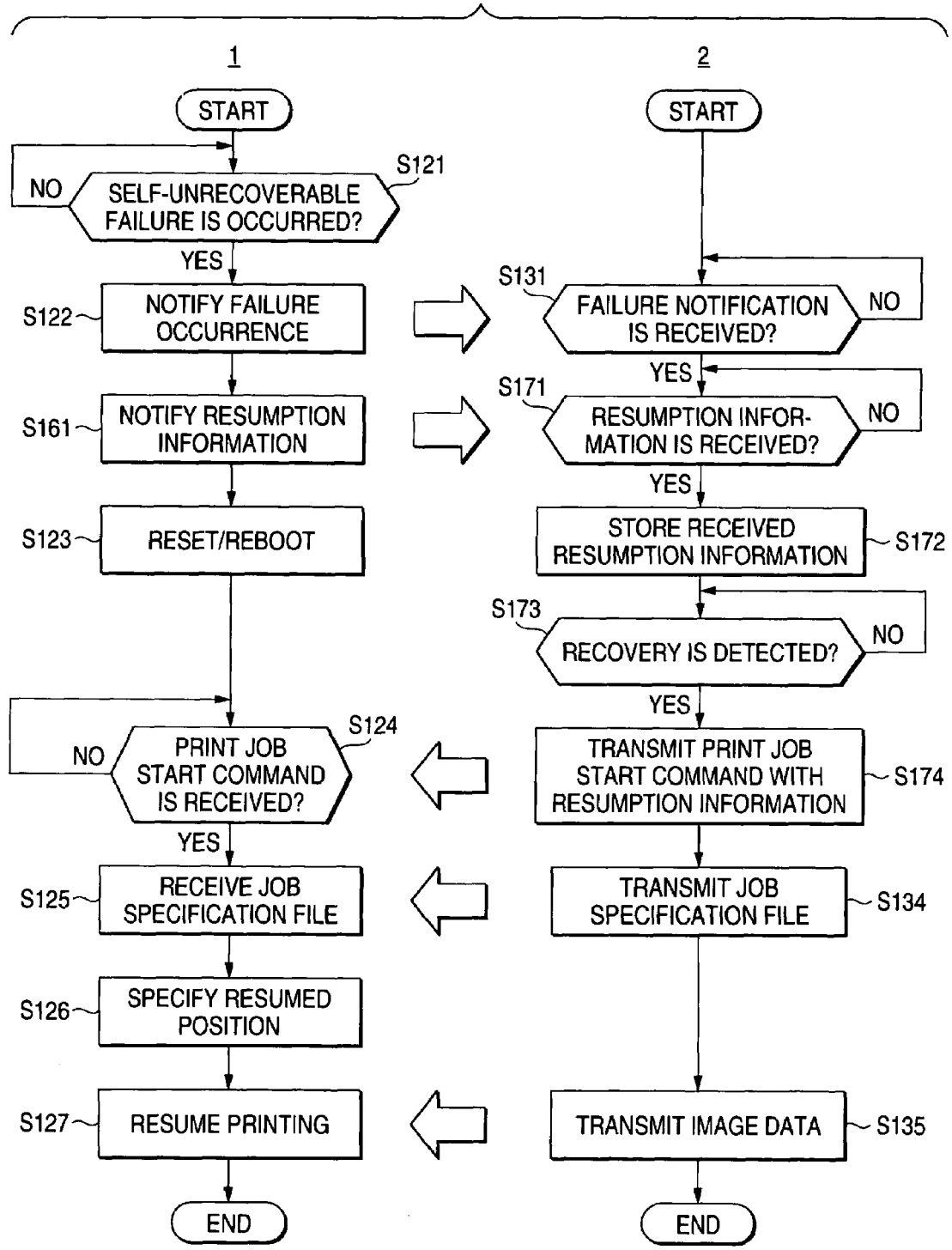
FIG. 29 is a flowchart for describing another example of recovery processing of the image output system according to the third embodiment of the invention.

As shown in FIG. 29, in the case of the recovery processing, if a failure has arisen, the image output device 1 reports occurrence of the failure (step S122) and transmits resumption information to the image supply device 2 (step S161).

The image supply device 2 receives the notification about occurrence of the failure (S131). Upon receipt of the resumption information (step S171), the image supply device 2 stores the received resumption information (step S172) and retains in a standby state until the image output device 1 recovers (step S173).

When the image output device 1 has recovered by resetting or rebooting operation (step S123), the image supply device 2 detects recovery of the image output device 1 and transmits the resumption information to the image output device 1 along with the print job start command (step S174). On the basis of the print job start command and resumption information, the image output device 1 resumes the print job in the manner mentioned previously.

The image output system of the third embodiment can be combined with any one of the other embodiments.

In the third embodiment, three items, such as a job ID, a path, and the number of repeated feeding operations are to be performed, are used as information showing a position for resuming printing operation. If the position for resuming printing operation can be specified accurately, only one or two of the items may be used. Further, another job status information item may also be used for resumption information.

In the third embodiment, job status information about first image data in a page layout of a page appearing after occurrence of a page break is used for resumption information. However, job status information about final image data in a page layout of a page appearing before occurrence of a page break may also be used for resumption information. In this case, a print job is resumed from a location after the position matching the resumption information in a series of print jobs.

As mentioned above, according to the third embodiment, the image output device 1 transmits, to the image supply device 2, resumption information showing an object of printing allocated to a predetermined location (in the embodiment, the page top) in a page layout during print processing performed as an image out operation. After the print processing has been aborted by a failure, the image output device 1 receives, from the image supply device 2, control information for specifying an object to be printed first at the time of resumption, along with the print job start command, and resumes the print processing from the object. The image supply device 2 receives and stores the resumption information. When the print processing is resumed, the image supply device 2 transmits, to the image output device 1, control information for specifying the object on the basis of the latest resumption information in conjunction with the print job start command. As a result the image output device 1 is reset, and print processing can be resumed accurately after recovery even when information has disappeared as a result of resetting of the image output device 1.

According to the third embodiment, for example, only when the image output device 1 has detected a failure, resumption information is transmitted to the image supply device 2. As a result, frequent exchange of resumption information for recovery purpose is not required. Therefore, print processing can be accurately resumed after recovery without involvement of an increase in processing during normal operation.

According to the third embodiment, for example, the image output device 1 transmits resumption information to the image supply device 2 on a per-page basis. As a result, even when transmission of resumption information has failed in the event of occurrence of a failure, print processing can be resumed accurately after recovery.

According to the third embodiment, the resumption information includes at least one of a job ID of: a print job pertaining to an object of printing allocated to a predetermined position in a page layout; information showing a location in the image supply device 2 where the object of printing is stored; and the number of times the object of printing is to be repetitively supplied. As a result, a printing resumption position can be accurately specified after recovery.

According to the third embodiment, the image supply device 2 uses, for resumption information, at least the number of times an object of printing is to be repetitively supplied. When a page break has arisen during the course of repeated supply of an object of printing, the number of repeated supply operations is changed to a remaining number of repeated supply operations. As a result, even when a plurality of numbers of repeated supply operations are set, print processing can be accurately resumed after recovery.

According to the third embodiment, when the image output device 1 has detected a failure, detection of the failure is reported to the image supply device 2. Subsequently, print processing is aborted. When the image supply device 2 receives a reset command, resumption information is transmitted to the image output device 1 along with the print job command. As a result, printing is resumed in response to a reset command after thorough recovery, and the print processing can be resumed accurately after recovery.

An image output system according to a fourth embodiment of the invention has a plurality of image output devices 1-1 to 1-*n*. When a failure has arisen in a certain image output device 1-*j*, an alternative image output device 1-*k* is retrieved, and image output processing is continuously performed by the alternative image output device 1-*k*.

Figure 30:
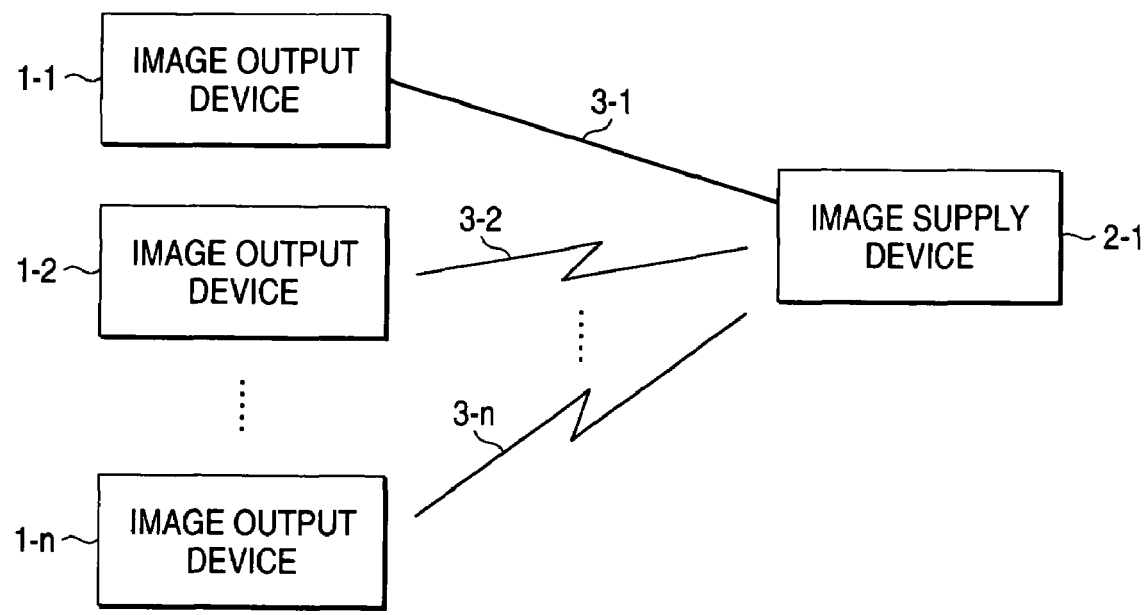
FIG. 30 is a block diagram showing the configuration of an image output system according to a fourth embodiment of the invention.

FIG. 30 is a block diagram showing the configuration of the image output system of the fourth embodiment The image output device 1-*i* (i=1, . . . , n) is analogous to the previously-described image output device 1 and has the communicator 11 corresponding to a communication channel 3-*i*. An image supply device 2-1 is analogous to the previously-described image supply device 2 and has, as a communicator 21, one or more communicators which can be connected to the plurality of image output devices 1-1 to 1-*n* by way of a cable communication channel 3-1 or wireless communication channels 3-2 to 3-*n*. Information for specifying the first object of printing when printing is resumed is transmitted to an image output device 1-*k* (k≠j) different from the image output device 1-*j* that has caused a failure, by way of any one of the communicators. At that time, the information described in connection with the third embodiment may be transmitted as information to be transmitted to the different image output device 1-*k* (k≠j), thereby resuming printing in the manner as mentioned in connection with the third embodiment. As a result, even when recovery is difficult at the image output device 1-*j*, the different image output device 1-*k* can accurately resume printing. Further, printing can be accurately, immediately resumed by the other image output device 1-*k* without awaiting recovery. This effect can be yielded similarly by a pull-printing type system.

If a failure has arisen during the course of printing operation performed by the image output device 1-1, the image supply device 2-1 selects any one from the remaining image output devices 1-2 to 1-*n* and, by way of any communicator, transmits information for specifying the first object of printing at the time of resumption of printing. On the basis of this information, the image output device 1-*k* that has received the information specifies the location where the job is to be resumed, thereby initiating print processing from that location.

The image supply device 2-1 may select an image output device 1-*r* capable of interpreting an image output control protocol (e g., the previously-described DPS protocol and PTP) employed by the image output device 2-1 from among the plurality of image output devices 1-2 to 1-*n* and may transmit, to the image output device 1-*r*, information for specifying an object to be printed first after the resumption.

The image supply device 2-1 may select, from among the plurality of image output devices 1-2 to 1-*n*, the image output device 1-*r* capable of performing printing operation under printing requirements specified by the interrupted print job, and may transmit information for specifying an object to be printed first after the resumption at the image output device 1-*r*. As a result, printing can be resumed in the same printing state as that achieved by the original image output device even when another image output device is used. Such printing requirements include a paper size, a paper type, color correction processing unique to a vendor, and superimposed printing of a frame image (i.e., a frame image is printed so as to overlap an image based on image data).

The image output system of the fourth embodiment can be combined with any one of the other embodiments.

Particularly, in a case where the image output system of this embodiment is combined with the configuration shown in FIG. 11, when any one of respective second entities of the image supply device 2-1 can establish communication with any one of the second entities of the image output devices 1-1 to 1-3 which are counterparts of communication, by way of the communication channel 3-*i* (i=1, 2, 3), the image supply device 2-1 may select a communicable second entity. As a result, erroneous use of a second entity incapable of communication is prevented, whereby control information pertaining to image output can be exchanged without fail.

Alternatively, the selector of the image supply device 2-1 may be configured to select second and third entities for each type of control information about image output the first entity attempts to transmit. As a result, an optimum low-level layer is used for each type of control information. Consequently, features of the respective image data file management protocols can be used in combination, thereby improving efficiency of communication and control.

Still alternatively, the selector of the image supply device 2-1 may select second and third entities differing from the current second and third entities, thereby switching the second and third entities to and from which control information about the image output is to be communicated. As a result, even when a failure has arisen in the second or third entity selected by the selector of the image supply device 2-1 or the second or third entity of the image output device 1-$i$ ($i$=1, 2, 3) that has established communication with the second or third entity, the selector of the image supply device 2-1 can continuously exchange control information about image output by utilization of other second and third entities of the image supply device 2-1. Consequently, the reliability of operation of the image output system is enhanced.

Still alternatively, the communicator 21 and the communication controller 22 of the image supply device 2-1 may be provided with a priority table showing the sequence of priority of a plurality of pairs of second and third entities. The selector of the image supply device 2-1 first selects a second entity having a higher priority in the priority table. When an alternative is selected in the event of a failure, second and third entities having higher priority levels may be selected. As a result, the selector of the image supply device 2-1 selects second and third entities in accordance with previously-set priority levels. Consequently, the second and third entities of the image supply device 2-1 can be selected from the user's desired viewpoint from among various viewpoints, such as a communication speed, reliability, or the like.

The previously-described embodiments are preferable examples of the invention. However, the invention is not limited to these embodiments. The invention is susceptible to various modifications or alterations within the scope of the invention.

For instance, in the respective embodiments, control information is described through use of XML which is one of the markup languages. However, another markup language such as SGML (Standard Generalized Markup Language) may be used for describing the control information.

In the previously-described respective embodiments, the PTP and the USB are used at hierarchical levels lower than the DPS protocol level. However, another protocol, such as a TCP/IP (Transmission Control Protocol/Internet Protocol) may also be used. At that time, a LAN cable, Bluetooth, a wireless LAN, or the like may also be used as a transmission medium.

The command names and the tag names of the DPS protocol used in the respective embodiments are not limited to those mentioned previously, other names may also be employed. Commands of the DPS protocol may also be embodied by other commands having the same function or a combination thereof.

In the respective embodiments, the image output device 1 can be embodied as a printer, and the image supply device 2 can be embodied as a digital camera for recording a moving image and/or a still image. Alternatively, the image output device 1 may also be embodied as another recording device for recording an image on a medium such as paper or a display for projecting an image of light such as a display. The image supply device 2 may also be embodied as an electronic device having a built-in digital camera or an electronic device which receives an image signal. Such an electronic device includes a mobile telephone, a PDA, a music player, a TV set, a video recording/reproducing apparatus, a picture phone, a video-conferencing system, etc. Further, the image supply device 2 may be embodied as a device having portability or a device not having much portability.

In the respective embodiments, upon completion of transfer of the image data required for image output from the image supply device 2 to the image output device 1, a notice indicating that connection with the image output device 1 can be released may be transmitted from the image output device 1 to the image supply device 2.

In the respective embodiments, a USB mass storage class may also be employed as the image data file management transfer protocol in place of the PTP.

The images described in connection with the embodiments may be embodied as text images in addition to picture images. Further, the object of image output may be a text, e.g., a title table or lyrics of a music album, such as a music CD or a music MD. In this case, for instance, the image supply device 2 or the image output device 1 acquires text data from a distribution server on the Internet in accordance with the information recorded on a music album.

In the second embodiment, the image output device 1 acquires a job specification file, analyzes the job specification file, and executes an image output job. Instead, the image supply device 2 may analyze a job specification file, produce an image output job start command as control information pertaining to image output, and transmit the command to the image output device 1, thereby executing an image output job.

What is claimed is:

1. An image processing method, performed by an image supply device storing image data and an image output device performing image processing with respect to the image data, which are connected via a communication path through which the image data is communicated, the method comprising steps of:

generating a control information item including a script for the image processing which is described by a markup language; and communicating the control information item between the image supply device and the image output device, the communicating step comprising:

interpreting a control protocol for communicating the control information item, by a first entity which executes processing for a first hierarchic layer of a communication protocol;

interpreting a management protocol for managing an image data file including the image data, by a second entity which executes processing for a second hierarchic layer of the communication protocol which is lower than the first hierarchic layer;

controlling a physical layer of the communication path, by a third entity which executes processing for a third hierarchic layer of the communication protocol which is lower than the second hierarchic layer; and translating a command in the control information item between the control protocol and the management protocol.

2. The image processing method as set forth in claim 1, wherein the management protocol is one of a picture transfer protocol (PTP) or a mass storage class of a universal serial bus (USB).

3. The image processing method as set forth in claim 1, wherein the third entity controls a universal serial bus (USB).

4. The image processing method as set forth in claim 3, wherein a still image capture device class is used for the USB.

5. The image processing method as set forth in claim 1, wherein the second entity manages the image data file through use of a predetermined file system.

6. The image processing method as set forth in claim 1, wherein the third entity controls one of a wireless local area network (LAN) and a peer to peer wireless data communication.

7. An image processing system, comprising;
an image supply device, operable to store image data; and
an image output device, connected to the image supply device via a communication path through which the image data is communicated, and operable to perform image processing with respect to the image data,
wherein each of the image supply device and the image output device comprises:
a communication controller, operable to communicate, between the image supply device and the image output device, a control information item including a script for the image processing which is described by a markup language;
a first entity, operable to execute processing for a first hierarchic layer of a communication protocol, and to interpret a control protocol for communicating the control information item;
a second entity, operable to execute processing for a second hierarchic layer of the communication protocol of the communication protocol which is lower than the first hierarchic layer, and to interpret a management protocol for managing an image data file including the image data;
a third entity, operable to execute processing for a third hierarchic layer of the communication protocol of the communication protocol which is lower than the second hierarchic layer, and to control a physical layer of the communication path; and
a translator, which translates a command in the control information item between the control protocol and the management protocol.

8. An image output device, connected to an image supply device storing image data via a communication path, the image output device comprising:
a communication controller, operable to communicate, between the image supply device and the image output device, a control information item including a script for the image processing which is described by a markup language;
a first entity, operable to execute processing for a first hierarchic layer of a communication protocol, and to interpret a control protocol for communicating the control information item;
a second entity, operable to execute processing for a second hierarchic layer of the communication protocol of the communication protocol which is lower than the first hierarchic layer, and to interpret a management protocol for managing an image data file including the image data;
a third entity, operable to execute processing for a third hierarchic layer of the communication protocol of the communication protocol which is lower than the second hierarchic layer, and to control a physical layer of the communication path; and
a translator, which translates a command in the control information item between the control protocol and the management protocol.

9. An image supply device, connected to an image output device performing image processing via a communication path, the image supply device comprising:
a storage, which stores image data to be subjected to the image processing;
a communication controller, operable to communicate, between the image supply device and the image output device, a control information item including a script for the image processing which is described by a markup language;
a first entity, operable to execute processing for a first hierarchic layer of a communication protocol, and to interpret a control protocol for communicating the control information item;
a second entity, operable to execute processing for a second hierarchic layer of the communication protocol of the communication protocol which is lower than the first hierarchic layer, and to interpret a management protocol for managing an image data file including the image data;
a third entity, operable to execute processing for a third hierarchic layer of the communication protocol of the communication protocol which is lower than the second hierarchic layer, and to control a physical layer of the communication path; and
a translator, which translates a command in the control information item between the control protocol and the management protocol.

10. An image processing method, performed by an image supply device storing image data and an image output device performing image processing with respect to the image data which are connected via a communication path through which the image data is communicated, the method comprising steps of:
generating a control information item including a script for the image processing which is described by a markup language; and
communicating the control information item between the image supply device and the image output device, the communicating step comprising:
interpreting a control protocol for communicating the control information item, by a first entity which executes processing for a first hierarchic layer of a communication protocol;
selecting one of second entities each executes processing for a second hierarchic layer of the communication protocol which is lower than the first hierarchic layer,
selecting one of third entities each executes processing for a third hierarchic layer of the communication protocol which is lower than the second hierarchic layer;
interpreting a management protocol for managing an image data file including the image data, by the selected one of the second entities;
controlling a physical layer of the communication path, by the selected one of the third entities; and
translating a command in the control information item between the control protocol and the management protocol.

11. The image processing method as set forth in claim 10, wherein the management protocol is one of a picture transfer protocol (PTP) or a mass storage class of a universal serial bus (USB).

12. The image processing method as set forth in claim 10, wherein the selected one of the third entities controls a universal serial bus (USB).

13. The image processing method as set forth in claim 12, wherein a still image capture device class is used for the USB.

14. The image processing method as set forth in claim 10, wherein the selected one of the second entities manages the image data file through use of a predetermined file system.

15. The image processing method as set forth in claim 10, wherein the selected one of the third entities controls one of a wireless local area network (LAN) and a peer to peer wireless data communication.

16. The image processing method as set forth in claim 15, wherein the selected one of the second entities is valid in both of the image supply device and the image output device.

17. The image processing method as set forth in claim 15, wherein the selecting step is performed in accordance with a state of the communication path.

18. The image processing method as set forth in claim 17, wherein the selecting step is performed based on a priority table such that one of the second entities and one of the third entities having respectively a relatively higher order in the priority table are selected prior to ones having a relatively lower order in the priority table.

19. An image processing system, comprising:
   an image supply device, operable to store image data; and
   an image output device, connected to the image supply device via a communication path through which the image data is communicated, and operable to perform image processing with respect to the image data,
   wherein each of the image supply device and the image output device comprises:
   a communication controller, operable to communicate, between the image supply device and the image output device, a control information item including a script for the image processing which is described by a markup language;
   a first entity, operable to execute processing for a first hierarchic layer of a communication protocol, and to interpret a control protocol for communicating the control information item;
   a plurality of second entities, each operable to execute processing for a second hierarchic layer of the communication protocol of the communication protocol which is lower than the first hierarchic layer, and to interpret a management protocol for managing an image data file including the image data;
   a plurality of third entities, each operable to execute processing for a third hierarchic layer of the communication protocol of the communication protocol which is lower than the second hierarchic layer, and to control a physical layer of the communication path;
   a selector, which selects one of the second entities and a third entities; and
   a translator, which translates a command in the control information item between the control protocol and the management protocol interpreted by the selected one of the second entities.

20. An image output device, connected to an image supply device storing image data via a communication path, the image output device comprising:
   a communication controller, operable to communicate, between the image supply device and the image output device, a control information item including a script for the image processing which is described by a markup language;
   a first entity, operable to execute processing for a first hierarchic layer of a communication protocol, and to interpret a control protocol for communicating the control information item;
   a plurality of second entities, each operable to execute processing for a second hierarchic layer of the communication protocol of the communication protocol which is lower than the first hierarchic layer, and to interpret a management protocol for managing an image data file including the image data;
   a plurality of third entities, each operable to execute processing for a third hierarchic layer of the communication protocol of the communication protocol which is lower than the second hierarchic layer, and to control a physical layer of the communication path;
   a selector, which selects one of the second entities and a third entities; and
   a translator, which translates a command in the control information item between the control protocol interpreted by the first entity and the management protocol interpreted by the selected one of the second entities.

21. An image supply device, connected to an image output device performing image processing via a communication path, the image supply device comprising:
   a storage, which stores image data to be subjected to the image processing;
   a communication controller, operable to communicate, between the image supply device and the image output device, a control information item including a script for the image processing which is described by a markup language;
   a first entity, operable to execute processing for a first hierarchic layer of a communication protocol, and to interpret a control protocol for communicating the control information item;
   a plurality of second entities, each operable to execute processing for a second hierarchic layer of the communication protocol of the communication protocol which is lower than the first hierarchic layer, and to interpret a management protocol for managing an image data file including the image data;
   a plurality of third entities, each operable to execute processing for a third hierarchic layer of the communication protocol of the communication protocol which is lower than the second hierarchic layer, and to control a physical layer of the communication path;
   a selector, which selects one of the second entities and a third entities; and
   a translator, which translates a command in the control information item between the control protocol interpreted by the first entity and the management protocol interpreted by the selected one of the second entities.

* * * * *